(12) United States Patent
Soliman et al.

(10) Patent No.: US 9,756,553 B2
(45) Date of Patent: Sep. 5, 2017

(54) SYSTEM AND METHOD FOR ASSISTED NETWORK ACQUISITION AND SEARCH UPDATES

(75) Inventors: Samir S. Soliman, San Diego, CA (US); Olufunmilola O. Awoniyi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 12/883,513

(22) Filed: Sep. 16, 2010

(65) Prior Publication Data

US 2012/0069800 A1  Mar. 22, 2012

(51) Int. Cl.
  *H04W 88/10* (2009.01)
  *H04W 48/08* (2009.01)
  *H04W 84/04* (2009.01)

(52) U.S. Cl.
  CPC .......... *H04W 48/08* (2013.01); *H04W 84/045* (2013.01); *H04W 88/10* (2013.01)

(58) Field of Classification Search
  None
  See application file for complete search history.

(56) References Cited

U.S. PATENT DOCUMENTS

| | | | |
|---|---|---|---|
| 5,872,774 A | 2/1999 | Wheatley, III | |
| 5,898,929 A | 4/1999 | Haartsen | |
| 6,151,311 A | 11/2000 | Wheatley, III | |
| 6,307,840 B1 | 10/2001 | Wheatley, III | |

(Continued)

FOREIGN PATENT DOCUMENTS

| | | |
|---|---|---|
| CN | 1398079 A | 2/2003 |
| CN | 1875648 A | 12/2006 |

(Continued)

OTHER PUBLICATIONS

3GPP TR 36.922 version 9.0.0 Release 9; LTE; Evolved Universal Terrestrial Radio Access (E-UTRA);TDD Home eNode B (HeNB) Radio Frequency (RF) requirements analysis, ETSI TR 136 922 V9.0.0, pp. 1-77, Apr. 2010.

(Continued)

*Primary Examiner* — Gregory Sefcheck
*Assistant Examiner* — Jenkey Van
(74) *Attorney, Agent, or Firm* — Bala Ramasamy

(57) ABSTRACT

A method and system provide assisted acquisition of a wireless link between user equipment and a femtocell unit. After an initial calibration of timing and/or frequency information, the user equipment enters into a low-power state. The femtocell unit monitors for system updates using a network listen module that sniffs the air interface of one or more neighboring cells. Upon a trigger event, the femtocell unit provides aiding information, for example, timing and/or frequency information corresponding to a change in timing and/or frequency of the air interface, over a second radio, e.g., a wireless personal area network interface. Thus, the user equipment may remain in the low-power state and receive updates with respect to the wireless wide area network interface. Subsequently, upon wake-up, the user equipment may utilize the aiding information, for example, to recalibrate its timing and/or frequency. Thus, acquisition of the wireless link with the femtocell unit may be expedited.

56 Claims, 8 Drawing Sheets

(56) References Cited

U.S. PATENT DOCUMENTS

| | | |
|---|---|---|
| 6,433,739 B1 | 8/2002 | Soliman |
| 6,590,881 B1 | 7/2003 | Wallace et al. |
| 6,847,630 B2 | 1/2005 | Blanz et al. |
| 6,970,708 B1* | 11/2005 | Raith .......................... 455/440 |
| 6,983,031 B2 | 1/2006 | Wheatley |
| 7,295,531 B2 | 11/2007 | Wheatley et al. |
| 7,391,759 B2 | 6/2008 | Wallace et al. |
| 7,512,111 B2 | 3/2009 | Kauhanen |
| 7,929,970 B1 | 4/2011 | Gunasekara et al. |
| 8,226,340 B1 | 7/2012 | Mahalingam |
| 8,244,257 B2 | 8/2012 | Walldeen et al. |
| 8,249,189 B2 | 8/2012 | Aoki et al. |
| 8,355,713 B1 | 1/2013 | Oh et al. |
| 2003/0114204 A1 | 6/2003 | Allen et al. |
| 2003/0123666 A1 | 7/2003 | Sambhwani et al. |
| 2003/0194992 A1 | 10/2003 | Kim et al. |
| 2004/0043746 A1 | 3/2004 | Hiramatsu |
| 2005/0058097 A1 | 3/2005 | Kang et al. |
| 2005/0094589 A1* | 5/2005 | Camp, Jr. ..................... 370/318 |
| 2005/0099972 A1 | 5/2005 | Motegi et al. |
| 2005/0130672 A1 | 6/2005 | Dean et al. |
| 2005/0186933 A1 | 8/2005 | Trans |
| 2006/0293067 A1 | 12/2006 | Leung et al. |
| 2007/0053340 A1 | 3/2007 | Guilford |
| 2007/0093268 A1 | 4/2007 | Hosono et al. |
| 2007/0201392 A1* | 8/2007 | Ramachandran ....... H04L 45/00 370/315 |
| 2007/0230393 A1 | 10/2007 | Sinha et al. |
| 2007/0254620 A1 | 11/2007 | Lindqvist et al. |
| 2007/0286136 A1 | 12/2007 | Rittle et al. |
| 2008/0002660 A1* | 1/2008 | Jeong et al. ................... 370/350 |
| 2008/0176568 A1* | 7/2008 | Palanki et al. ................ 455/436 |
| 2008/0181195 A1 | 7/2008 | Cho et al. |
| 2008/0188266 A1 | 8/2008 | Carter et al. |
| 2008/0254812 A1* | 10/2008 | Kitazoe ....................... 455/456.2 |
| 2008/0261596 A1 | 10/2008 | Khetawat et al. |
| 2008/0268856 A1 | 10/2008 | Francalanci et al. |
| 2008/0285529 A1 | 11/2008 | Kwak et al. |
| 2008/0285539 A1 | 11/2008 | Tiedemann, Jr. et al. |
| 2008/0311926 A1 | 12/2008 | Fischer et al. |
| 2009/0055541 A1 | 2/2009 | Sato et al. |
| 2009/0067417 A1 | 3/2009 | Kalavade et al. |
| 2009/0086691 A1 | 4/2009 | Balasubramanian |
| 2009/0092122 A1 | 4/2009 | Czaja et al. |
| 2009/0097452 A1 | 4/2009 | Gogic |
| 2009/0131049 A1* | 5/2009 | Osborn ......................... 455/435.1 |
| 2009/0163216 A1 | 6/2009 | Hoang et al. |
| 2009/0164547 A1 | 6/2009 | Ch'ng et al. |
| 2009/0185632 A1 | 7/2009 | Cai et al. |
| 2009/0196266 A1 | 8/2009 | Wu et al. |
| 2009/0210888 A1 | 8/2009 | Lee et al. |
| 2009/0219888 A1 | 9/2009 | Chen et al. |
| 2009/0221303 A1* | 9/2009 | Soliman ......................... 455/458 |
| 2009/0247084 A1 | 10/2009 | Palanki |
| 2009/0253421 A1 | 10/2009 | Camp, Jr. et al. |
| 2009/0258672 A1* | 10/2009 | Camp et al. .................. 455/553.1 |
| 2009/0290555 A1 | 11/2009 | Alpert et al. |
| 2009/0316591 A1 | 12/2009 | Reial et al. |
| 2009/0316654 A1 | 12/2009 | Prakash et al. |
| 2010/0027694 A1* | 2/2010 | Touboul et al. ............... 375/260 |
| 2010/0035601 A1 | 2/2010 | Chen et al. |
| 2010/0035629 A1* | 2/2010 | Soliman ......................... 455/455 |
| 2010/0041364 A1 | 2/2010 | Lott et al. |
| 2010/0046494 A1 | 2/2010 | Palanki et al. |
| 2010/0054237 A1 | 3/2010 | Han et al. |
| 2010/0061356 A1 | 3/2010 | Qvarfordt et al. |
| 2010/0067433 A1 | 3/2010 | Cheng et al. |
| 2010/0067507 A1 | 3/2010 | Park |
| 2010/0085913 A1 | 4/2010 | Subrahmanya |
| 2010/0105377 A1 | 4/2010 | Iwamura et al. |
| 2010/0111070 A1 | 5/2010 | Hsu |
| 2010/0135248 A1 | 6/2010 | Aramaki et al. |
| 2010/0136997 A1 | 6/2010 | Palanki et al. |
| 2010/0141400 A1 | 6/2010 | Radulescu et al. |
| 2010/0150109 A1 | 6/2010 | Bradley et al. |
| 2010/0157906 A1 | 6/2010 | Yang et al. |
| 2010/0173630 A1 | 7/2010 | Han et al. |
| 2010/0197309 A1 | 8/2010 | Fang et al. |
| 2010/0203891 A1 | 8/2010 | Nagaraja et al. |
| 2010/0210239 A1 | 8/2010 | Karaoguz et al. |
| 2010/0222068 A1 | 9/2010 | Gaal et al. |
| 2010/0242103 A1 | 9/2010 | Richardson et al. |
| 2010/0260168 A1 | 10/2010 | Gheorghiu et al. |
| 2011/0002284 A1 | 1/2011 | Talwar et al. |
| 2011/0019604 A1 | 1/2011 | Chun et al. |
| 2011/0058503 A1 | 3/2011 | Ono |
| 2011/0059739 A1 | 3/2011 | Huang |
| 2011/0098042 A1 | 4/2011 | Mach et al. |
| 2011/0128916 A1 | 6/2011 | Kwon et al. |
| 2011/0158164 A1 | 6/2011 | Palanki et al. |
| 2011/0176483 A1 | 7/2011 | Palanki et al. |
| 2011/0182252 A1 | 7/2011 | Liu et al. |
| 2011/0216734 A1* | 9/2011 | Yu ............................. H04J 11/00 370/330 |
| 2011/0275402 A1 | 11/2011 | Charipadi et al. |
| 2011/0281571 A1 | 11/2011 | Patel et al. |
| 2011/0281574 A1 | 11/2011 | Patel et al. |
| 2011/0300870 A1 | 12/2011 | Chun et al. |
| 2011/0312317 A1 | 12/2011 | Sahin et al. |
| 2012/0040659 A1 | 2/2012 | Iwamura et al. |
| 2012/0044908 A1 | 2/2012 | Spinelli et al. |
| 2012/0046025 A1 | 2/2012 | Das et al. |
| 2012/0046026 A1 | 2/2012 | Chande et al. |
| 2012/0046063 A1 | 2/2012 | Chande et al. |
| 2012/0052793 A1 | 3/2012 | Brisebois et al. |
| 2012/0052855 A1 | 3/2012 | Soliman et al. |
| 2012/0094663 A1 | 4/2012 | Awoniyi et al. |
| 2012/0115496 A1 | 5/2012 | Soliman et al. |
| 2012/0142392 A1 | 6/2012 | Patel et al. |
| 2012/0178482 A1 | 7/2012 | Seo et al. |
| 2012/0184206 A1 | 7/2012 | Kim et al. |
| 2013/0005326 A1 | 1/2013 | Flanagan |
| 2013/0059592 A1 | 3/2013 | Chakraborty et al. |
| 2013/0095789 A1 | 4/2013 | Keevill et al. |
| 2013/0294425 A1 | 11/2013 | Song et al. |
| 2014/0134997 A1 | 5/2014 | Song et al. |

FOREIGN PATENT DOCUMENTS

| | | |
|---|---|---|
| CN | 101155167 A | 4/2008 |
| EP | 1089499 A2 | 4/2001 |
| EP | 1809056 A2 | 7/2007 |
| EP | 1871035 A1 | 12/2007 |
| GB | 2446192 | 8/2008 |
| JP | 6334593 A | 12/1994 |
| JP | 2002505542 A | 2/2002 |
| JP | 2004112225 A | 4/2004 |
| JP | 2005184824 A | 7/2005 |
| JP | 2007534221 A | 11/2007 |
| JP | 2007536788 A | 12/2007 |
| JP | 2008172380 A | 7/2008 |
| JP | 4352281 B1 | 10/2009 |
| JP | 2009232434 A | 10/2009 |
| JP | 2009239568 A | 10/2009 |
| JP | 2010041537 A | 2/2010 |
| JP | 2010512054 A | 4/2010 |
| JP | 2010166163 A | 7/2010 |
| JP | 2010199797 A | 9/2010 |
| KR | 20100034579 A | 4/2010 |
| TW | 200926649 | 6/2009 |
| WO | 9809390 A1 | 3/1998 |
| WO | 9937037 | 7/1999 |
| WO | WO-9944306 A1 | 9/1999 |
| WO | WO-03043229 A1 | 5/2003 |
| WO | WO-2005048628 A1 | 5/2005 |
| WO | WO-2005109767 A1 | 11/2005 |
| WO | WO-2006101065 A1 | 9/2006 |
| WO | 2008066957 A2 | 6/2008 |
| WO | 2008094334 A1 | 8/2008 |
| WO | 2008139707 A1 | 11/2008 |
| WO | 2008140225 A1 | 11/2008 |
| WO | 2009006041 A1 | 1/2009 |
| WO | 2009049207 A2 | 4/2009 |
| WO | 2010017226 A2 | 2/2010 |

(56) References Cited

FOREIGN PATENT DOCUMENTS

| WO | WO-2010022371 | 2/2010 |
|---|---|---|
| WO | 2010033438 | 3/2010 |
| WO | WO-2010033413 | 3/2010 |

OTHER PUBLICATIONS

"3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 9)", 3GPP Standard; 3GPP TR 36.922, 3rd Generation Partnership Project (3GPP), Mobile Competence Centre ; 650, Route Des Lucioles ; F-06921 Sophia-Antipolis Cedex ; France, No. V9.1.0, Jun. 21, 2010 (Jun. 21, 2010), pp. 1-74, XP050441979, [retrieved on Jun. 21, 2010].

3rd Generation Partnership Project, Technical Specification Group Radio Access Networks, Home Node B Radio Frequency (RF) Requirements (FDD) (Release 9), 3GPP Standard, 3GPP TR 25.967, 3rd Generation Partnership Project (3GPP), Mobile Competence Centre, 650, Route Des Lucioles, F-06921 Sophia-Antipolis Cedex, France, No. 9.0.0, May 1, 2009 (May 1, 2009), pp. 1-55, XP050369580, paragraph [0007].

Co-pending U.S. Appl. No. 61/094,100, filed Sep. 4, 2008.

International Search Report and Written Opinion—PCT/US2011/051808—ISA/EPO—dated Dec. 23, 2011.

LG Electronics: "Methods to facilitate the inter-cell coordination in heterogeneous networks", 3GPP Draft; R1-105358 Coordination_Method, 3rd Generation Partnership Project (3GPP), Mobile Competence Centre ; 650, Route Des Lucioles ; F-06921 Sophia-Antipolis Cedex ; France, vol. RAN WG1, no. Xi'an; Oct. 11, 2010, Oct. 5, 2010 (Oct. 5, 2010), XP050450509, [retrieved on Oct. 5, 2010].

Mediatek Inc: "Further Discussion on HeNB Downlink Power Setting in HetNet", 3GPP Draft; R1-105238 Power Setting in HetNet, 3rd Generation Partnership Project (3GPP), Mobile Competence Centre ; 650, Route Des Lucioles ; F 06921 Sophia-Antipolis Cedex ; France, vol. RAN WG1, no. Xi 'an; Oct. 11, 2010, Oct. 5, 2010 (Oct. 5, 2010), XP050450424, [retrieved on Oct. 5, 2010].

Mitsubishi Electric: "Dynamic Setup of HNBs for Energy Savings and Interference Reduction", 3GPP Draft; R3-081949 (Dynamic Setup HNBs), 3rd Generation Partnership Project (3GPP), Mobile Competence Centre ; 650, Route Des Lucioles ; F-06921 Sophia-Antipolis Cedex ; France, vol. RNA WG3, no. Jeju Island; Aug. 13, 2008, Aug. 13, 2008 (Aug. 13, 2008), XP050165010, [retrieved on Aug. 13, 2008].

Qualcomm Europe et al., "TDD HeNB Synchronization Requirement for Large Propagation Distance Case", 3GPP Draft, R4-094985, 3rd Generation Partnership Project (3GPP), Mobile Competence Centre, 650, Route Des Lucioles, F-06921 Sophia-Antipolis Cedex, France, no. Jeju, Nov. 9, 2009, Nov. 9, 2009 (Nov. 9, 2009), XP050394434, [retrieved on Nov. 17, 2009].

Qualcomm Europe: "HeNB Timing Requirements", 3GPP Draft, R4-091902 Timing Requirements, 3rd Generation Partnership Project (3GPP), Mobile Competence Centre, 650, Route Des Lucioles, F-06921 Sophia-Antipolis Cedex, France, no. San Francisco, Apr. 27, 2009, Apr. 27, 2009 (Apr. 27, 2009), XP050342629, [retrieved on Apr. 27, 2009] paragraph [0002].

Qualcomm Europe: "Text Proposal on TDD HeNB Synchronization Requirement", 3GPP Draft, R4-093725 Text Proposal for HeNB Sync Requirements, 3rd Generation Partnership Project (3GPP), Mobile Competence Centre, 650, Route Des Lucioles, F-06921 Sophia-Antipolis Cedex, France, no. Miyazaki, Oct. 12, 2009, Oct. 12, 2009 (Oct. 12, 2009), XP050393326, [retrieved on Oct. 6, 2009].

Qualcomm Europe: "Synchronization Requirements and Techniques", 3GPP Draft, R4091336, 3rd Generation Partnership Project (3GPP), Mobile Competence Centre, 650, Route Des Lucioles, F-06921 Sophia-Antipolis Cedex, France, no. Seoul, Korea, Mar. 19, 2009, Mar. 19, 2009 (Mar. 19, 2009), XP050342103, [retrieved on Mar. 19, 2009].

Universal Mobile Telecommunications System (UMTS), Physical layer, Measurements (TDD) (3GPP TS 25.225 version 8.2.0 Release 8), ETSI TS 125 225, ETSI Standard, European Telecommunications Standards Institute (ETSI), Sophia Antipolis Cedex, France, vol. 3-R1, No. V8.2.0, Mar. 1, 2009 (Mar. 1, 2009), XP014043978, paragraph [0007].

Motorola: "PCID confusion", R2-092307, 3GPP TSG RAN WG2 #65bis Mar. 23-27, 2009, Seoul, Korea, pp. 1-3.

Qualcomm Europe: "Network support for inbound handover of pre-Rel-9 UMTS UEs", R3-091213, 3GPP TSG RAN WG 3 #64, May 4-8, 2009 San Francisco, USA, pp. 1-3.

Damnjanovic et al., "A Survey on 3GPP Heterogeneous Networks", IEEE Wireless Communications, pp. 10-21 (Jun. 2011).

Domenico A.D., et al., "A Survey on Mac Strategies for Cognitive Radio Networks", IEEE Communications Surveys, IEEE, New York, NY, US, vol. 14, No. 1, Jan. 1, 2012 (Jan. 1, 2012), pp. 21-44, XP011420410, ISSN: 1553-877X, DOI: 10.1109/SURV.2011.111510.00108.

Yavuz M., et al.,"Interference management and performance analysis of UMTS/HSPA+ femtocells", IEEE Communications Magazine, IEEE Service Center, Piscataway, US, vol. 47, No. 9, Sep. 1, 2009 (Sep. 1, 2009), pp. 102-109, XP011283371, ISSN: 0163-6804, DOI: 10.1109/MCOM.2009.5277462.

* cited by examiner

SYSTEM AND METHOD FOR ASSISTED NETWORK ACQUISITION AND SEARCH UPDATES

BACKGROUND

Field

The present application relates generally to wireless communications, and more specifically to methods and systems for acquisition of wireless communication with a femtocell unit.

Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line broadband communications with mobile broadband communications and have increasingly demanded great voice quality, reliable service, and low prices, especially at their home or office locations.

In addition to the mobile phone networks currently in place, a new class of small base stations has emerged, which may be installed in a user's home or office and provide enhanced indoor wireless coverage to mobile units using existing broadband Internet connections. Such personal miniature base stations are generally known as femtocells, or, alternatively, access point base stations, Home Node B (HNB), or Home eNode B (HeNB). Typically, such miniature base stations are connected to the Internet and the mobile operator's network via DSL router or cable modem, thus providing connectivity between the user's UE and the Internet.

In wireless communication networks, a mobile station, access terminal (AT) or user equipment (UE) typically scans a defined frequency spectrum to identify one or more access nodes (e.g., macrocells, microcells, picocells, femtocells, base stations, etc.) through which it may obtain wireless communication service. This is often referred to as system acquisition, and typically happens when the UE is powered on after being off for some time, when the UE recovers from lack of coverage, or when it switches between two different networks (e.g., 2G and 3G networks). In these cases, the UE generally searches through a list of carrier frequency candidates. For each frequency, the UE may attempt to detect a preamble or acquire a scrambling code and phase of a carrier signal from the strongest base station detected or found. The length of the frequency list depends on the actual scenario. For example, if the UE has been moved outside its home coverage area (e.g., service region, state, city, country, etc.) while it was powered off, then the frequency list can be quite long. Most often, the correct carrier frequency is not known and the frequency scanning process involves a coarse frequency scan where a frequency band may be identified followed by fine frequency scan where particular channels within the frequency band may be scanned. Cell or base station acquisition may then be done on each channel where energy is found during the fine frequency scan. During the cell acquisition, the UE searches for service both in frequency and code space, which is typically an undesirably large number of hypotheses or combinations to search. Once an appropriate base station is selected, the UE is ready to communicate signaling messages to establish a data and/or voice session via the selected base station.

Due to the scanning performed by the UE to identify access nodes and acquire a scrambling code and phase, the acquisition process may take a noticeably long time. Consequently, a way to expedite and/or improve the acquisition process would be beneficial.

SUMMARY

A method and system provide assisted acquisition of a wireless link between user equipment and a femtocell unit. After an initial calibration of timing and/or frequency information, the user equipment enters into a low-power state. The femtocell unit monitors for system updates using a network listen module that sniffs the air interface of one or more neighboring cells. Upon a trigger event, the femtocell unit provides aiding information, for example, timing and/or frequency information corresponding to a change in timing and/or frequency of the air interface, over a second radio, e.g., a wireless personal area network interface. Thus, the user equipment may remain in the low-power state and receive updates with respect to the wireless wide area network interface. Subsequently, upon wake-up, the user equipment may utilize the aiding information, for example, to recalibrate its timing and/or frequency. Thus, acquisition of the wireless link with the femtocell unit may be expedited.

In an aspect of the disclosure, an apparatus for wireless communication includes a network interface for gathering aiding information corresponding to at least one cell of a network, a first radio for providing a communication channel to user equipment, and a second radio for providing an aiding information message that includes the aiding information gathered from the at least one cell to the user equipment.

In another aspect of the disclosure, a method of wireless communication includes determining aiding information for adjusting a first wireless link with a user equipment, transmitting the aiding information to the user equipment over a second wireless link, different from the first wireless link, and communicating with the user equipment over the first wireless link. Here, the communicating utilizes an adjustment to the first wireless link corresponding to the aiding information.

In yet another aspect of the disclosure, a method of wireless communication includes performing system calibration of timing and/or frequency information corresponding to a first radio link with a femtocell, receiving aiding information over a second radio link with the femtocell different from the first radio link with the femtocell, the aiding information corresponding to an adjustment of the timing and/or frequency information corresponding to the first radio link with the femtocell, and adjusting a timing and/or frequency characteristic of the first radio link with the femtocell in accordance with the aiding information.

In yet another aspect of the disclosure, an apparatus for wireless communication includes means for performing an initial calibration of timing and/or frequency information corresponding to a first radio link with a femtocell, means for receiving aiding information over a second radio link with the femtocell different from the first radio link with the femtocell, the aiding information corresponding to an adjustment of the timing and/or frequency information corresponding to the first radio link with the femtocell, and means for adjusting a timing and/or frequency characteristic of the first radio link with the femtocell in accordance with the aiding information.

In yet another aspect of the disclosure, an apparatus for wireless communication includes means for determining aiding information for adjusting a first wireless link with a user equipment, means for transmitting the aiding information over a second wireless link, different from the first wireless link, to the user equipment, and means for communicating with the user equipment over the first wireless link, wherein the means for communicating is configured to utilize an adjustment corresponding to the aiding information.

In yet another aspect of the disclosure, a computer program product includes a computer-readable medium having code for determining aiding information for adjusting a first wireless link with a user equipment, transmitting the aiding information over a second wireless link, different from the first wireless link, to the user equipment, and communicating with the user equipment over the first wireless link, wherein the communicating utilizes an adjustment corresponding to the aiding information.

In yet another aspect of the disclosure, an apparatus for wireless communication includes at least one processor and a memory coupled to the at least one processor, wherein the at least one processor is configured to determine aiding information for adjusting a first wireless link with a user equipment, transmit the adjustment information over a second wireless link, different from the first wireless link, to the user equipment, and communicate with the user equipment over the first wireless link, wherein the communicating utilizes an adjustment corresponding to the adjustment information.

These and other aspects of the disclosure will become readily apparent to one skilled in the art upon a review of the detailed description, which follows.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal Frequency Division Multiplexing (OFDM) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR) TD-SCDMA. cdma2000 covers IS-2000, IS-95 and IS-856 standards. A TDMA network may implement a radio technology such as Global System for Mobile Communications (GSM). An OFDM network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an advanced release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
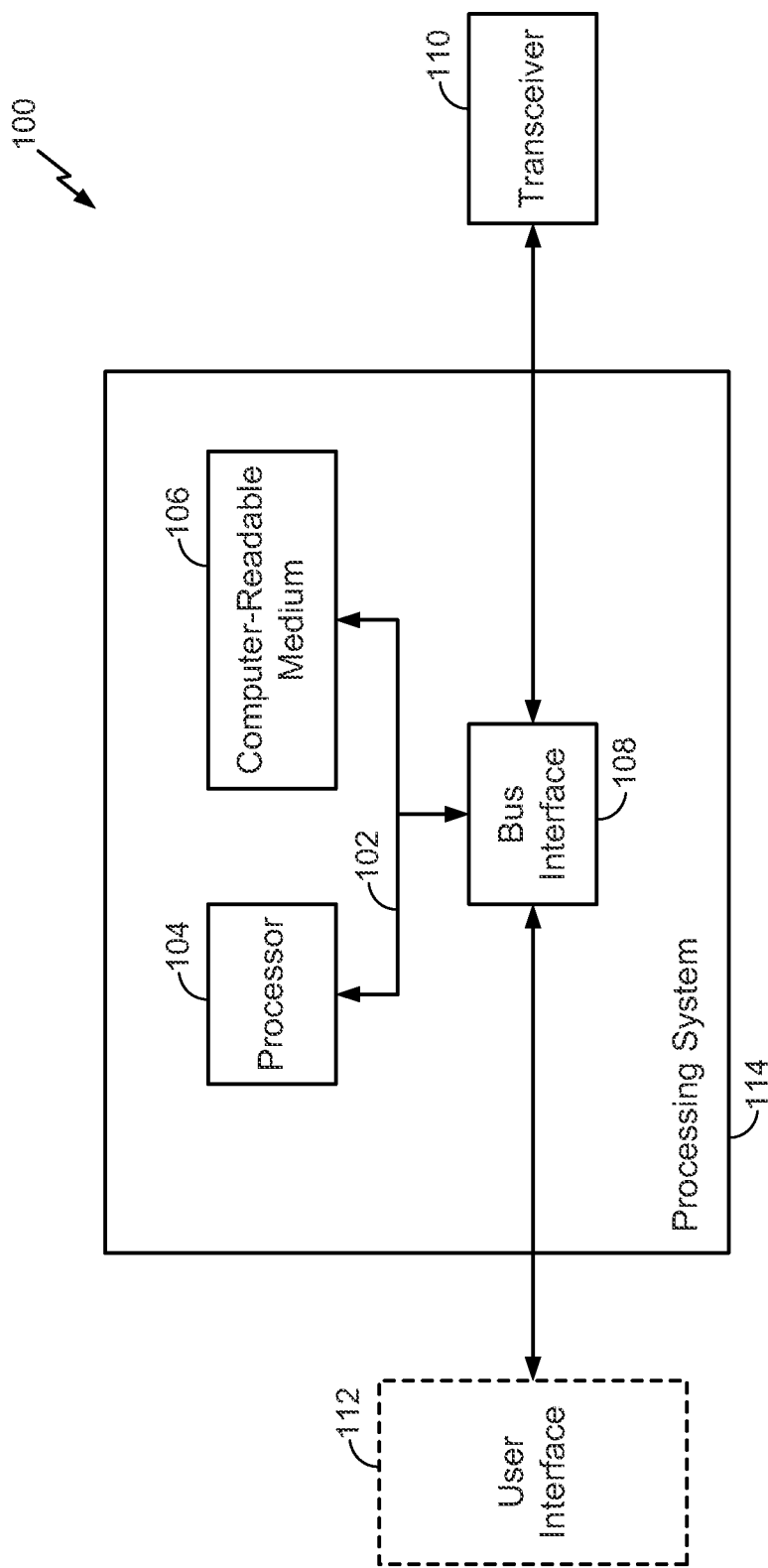
FIG. 1 is a conceptual diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
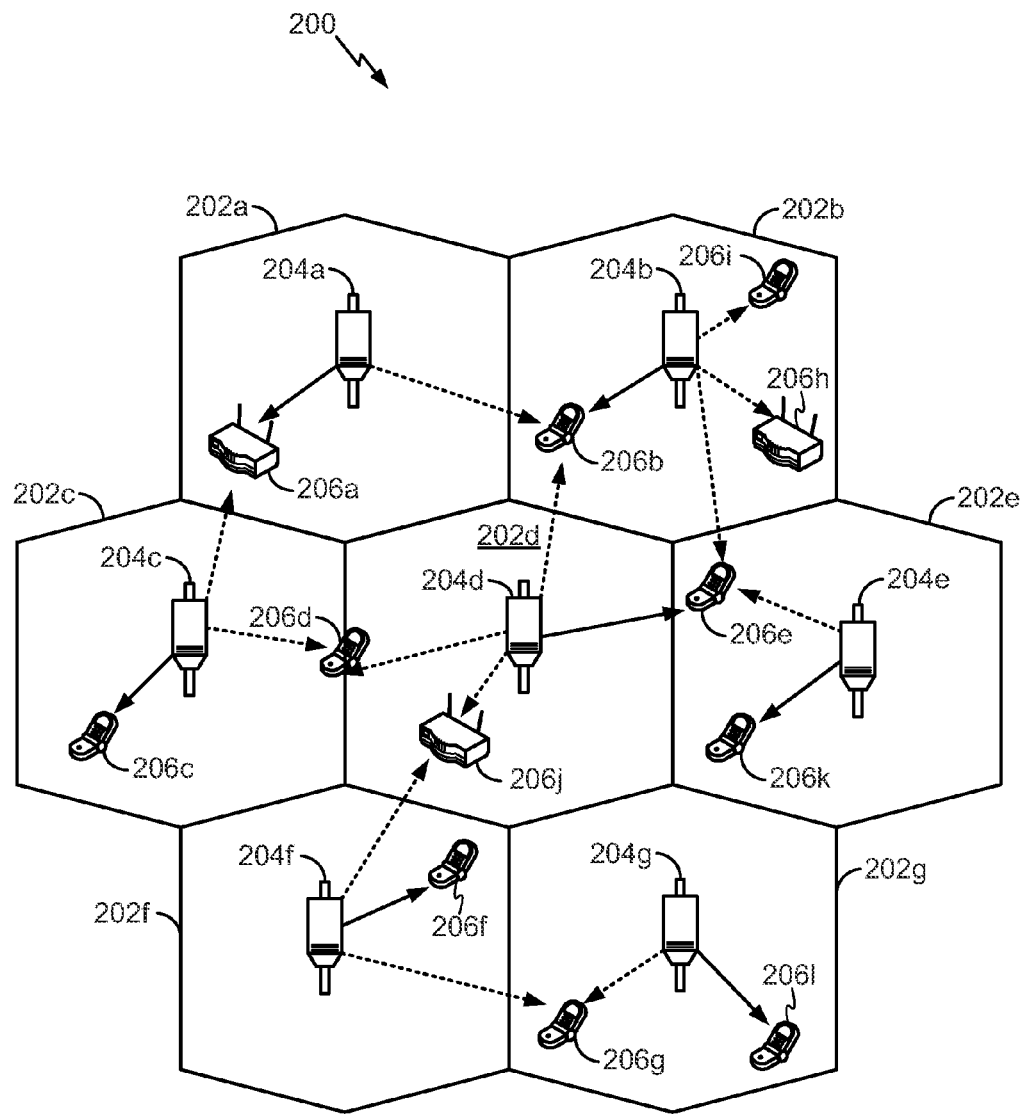
FIG. 2 illustrates an exemplary wireless communication system.

FIG. 2 illustrates an exemplary wireless communication system 200 configured to support a number of users, in which various disclosed embodiments and aspects may be implemented. As shown in FIG. 2, by way of example, system 200 provides communication for multiple cells 202, such as, for example, macrocells 202a-202g, with each macrocell 202 being serviced by a corresponding base station 204 (such as base stations 204a-204g), also known variously as Node Bs (NBs), eNode Bs (eNBs), etc. Each macrocell 202 may be further divided into two or more sectors. Each of the base stations 204 may be suitably coupled to a core network (not illustrated), enabling information to be passed between the various base stations 204 and, in some examples, to the Internet. Various UE 206, including fixed or mobile stations 206a-206k, also known variously as access terminals (AT), etc., are dispersed throughout the system. Each UE 206 may communicate with one or more base stations 204 on a downlink (DL) and/or an uplink (UL) at a given moment, depending upon whether the base station 204 is active and whether it is in soft handoff, for example. The wireless communication system 200 may provide service over a large geographic region; for example, macrocells 202 may cover a few blocks in a neighborhood. In another example, the macrocells 202 may be augmented by, or one or more of the macrocells may be replaced by, smaller cells (i.e., having a smaller geographic service area) such as so-called microcells or picocells. As discussed below, the wireless communication system 200 may be further augmented by femtocells with even smaller and more specific geographic coverage areas.

In general, when a UE 206 is switched on, a public land mobile network (PLMN) is selected and the UE 206 searches for a suitable cell of this PLMN to camp on. Criteria for cell selection and cell re-selection between radio access technologies (RATs) generally depend on various radio criteria. In addition to the RAT, the PLMN type may differ as well. The UE 206 searches for a suitable cell of the selected PLMN and chooses that cell to provide available services, and tunes to its control channel. This choosing is known as "camping on the cell". The UE 206 will, if necessary, then register its presence in the registration area of the chosen cell and as the outcome of a successful Location Registration the selected PLMN becomes the registered PLMN.

If the UE 206 finds a more suitable cell, it reselects onto that cell and camps on it. If the new cell is in a different registration area, location registration is performed. If necessary, the UE 206 may search for higher priority PLMNs at regular time intervals and search for a suitable cell if another PLMN has been selected.

Figure 3:
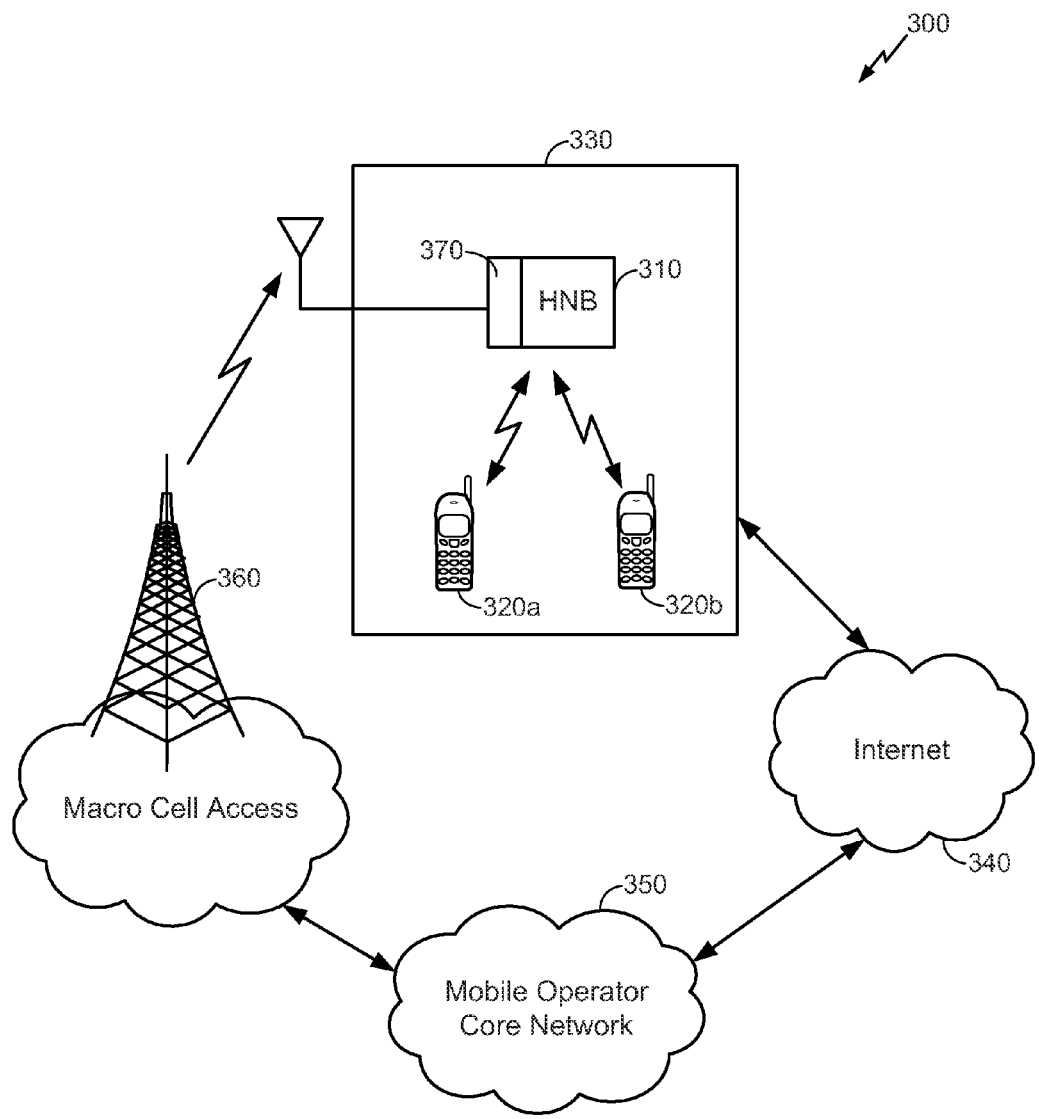
FIG. 3 illustrates an exemplary communication system to enable deployment of Home Node Bs (HNBs) within a network environment.

FIG. 3 illustrates an exemplary communication system to enable deployment of a femtocell within a network environment. As shown in FIG. 3, the system 300 includes a femtocell unit 310, also known variously as a HNB, HeNB, Femto Access Point (FAP), or access point base station. Here, the femtocell unit 310 is installed in a small scale network environment, such as a user residence 330, and is configured to serve associated, as well as alien, UEs 320a and 320b. The femtocell unit 310 may be coupled by way of a backhaul connection to the Internet 340 and a mobile operator core network 350 via a DSL router, a cable modem, or other suitable Internet access point (not shown). Further, the femtocell unit 310 may be communicatively coupled to one or more macrocell base stations 360 utilizing network listen circuitry 370 for sniffing the air interface broadcasted by one or more of the macrocell base stations 360. This network listen module and its functionality are discussed below in further detail.

Although embodiments described herein use 3GPP terminology, it is to be understood that the embodiments may be applied to 3GPP technology, as well as 3GPP2 technology and other known and related technologies. In such embodiments described herein, the owner of the femtocell unit 310 subscribes to a mobile service, such as, for example, 3G mobile service from a provider of HSPA, offered through the mobile operator core network 350, and the UE, e.g., the UE 320, is able to operate both in a macrocellular environment and in a residential small scale network environment. Thus, the femtocell unit 310 may be backward compatible with any existing UE 320.

Figure 4:
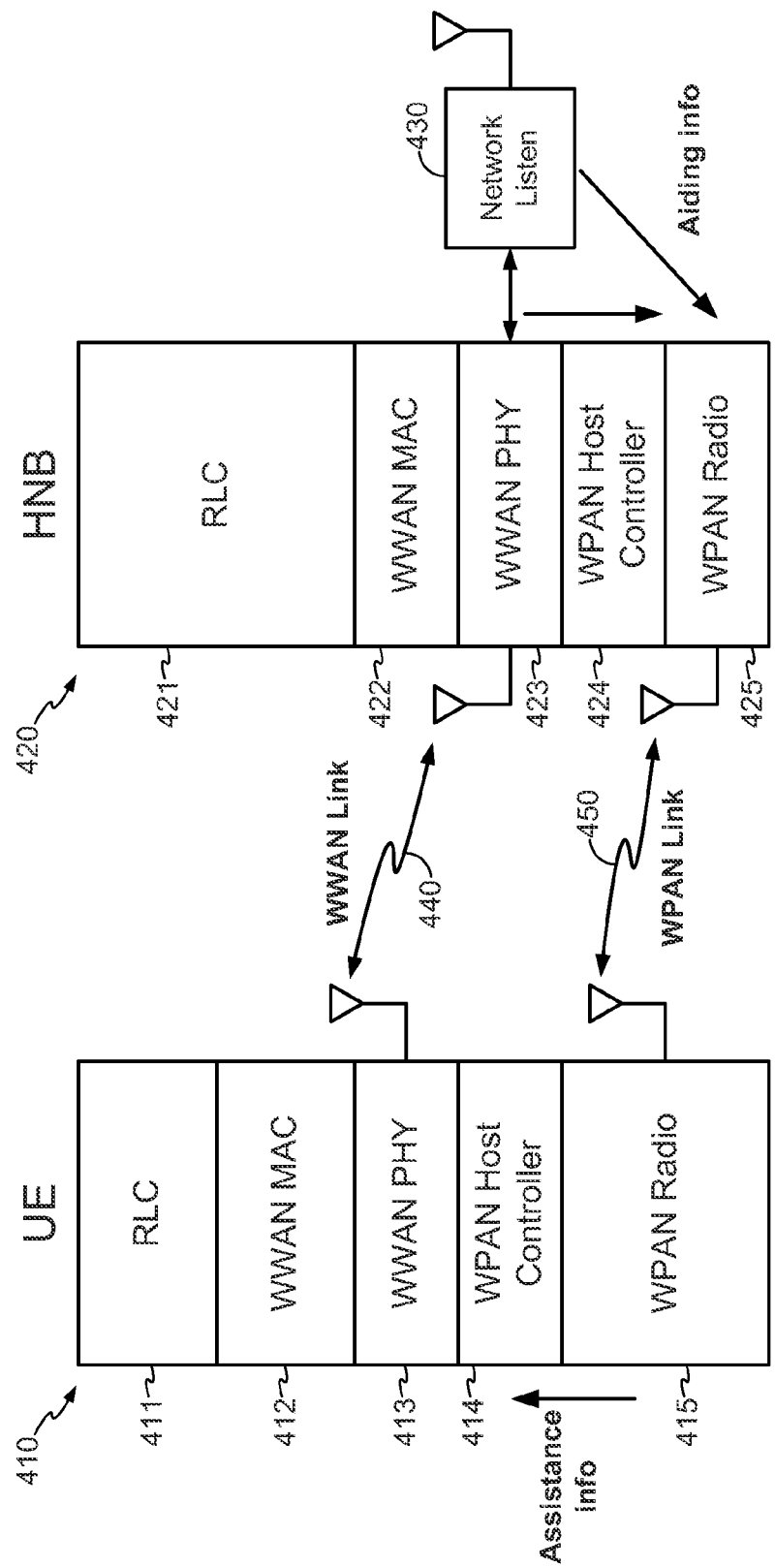
FIG. 4 is a schematic block diagram illustrating a UE in communication with a HNB over a WWAN link and a WPAN link.

FIG. 4 is a block diagram conceptually illustrating a UE 410 in an area serviced by a HNB 420. In various aspects of the disclosure, the UE 410 may be one of the UEs 320 illustrated in FIG. 3, the UE 206 illustrated in FIG. 2, or any suitable mobile device capable of communicating with the HNB 420. Similarly, in various aspects of the disclosure the HNB 420 may be the femtocell unit 310 illustrated in FIG. 3, or any suitable femtocell unit. Further, each of the UE 410 and the HNB 420 may include a processing system 100 as illustrated in FIG. 1, including one or more processors 104, computer readable media 106, and bus interfaces 108. In the illustration of FIG. 4, various layers of a protocol stack are illustrated in the UE 410 and the HNB 420. Those skilled in the art will comprehend that these layers may be embodied in an integrated processing system or computer program product, or may be separate modules or circuitry in accordance with various design choices.

Here, the illustrated UE 410 includes radio link control (RLC) layer 411 for handling error recovery and flow control for the UE 410; a wireless wide-area network (WWAN) layer including a WWAN medium access control (MAC) layer 412 for providing addressing and channel access control for the UE 410 and a WWAN physical (PHY) layer 413 for handling basic hardware transmission details for the UE 410; and a wireless personal area network (WPAN) layer including a WPAN host controller 414 for managing a WPAN connection for the UE 410 and a WPAN radio 415 for providing a radio link over the WPAN to the UE 410. The illustrated HNB 420 includes an RLC layer 421; a WWAN layer including a WWAN MAC layer 422 and a WWAN PHY layer 423; and a WPAN layer including a WPAN host controller 424 and a WPAN radio 425. Further, the HNB 420 may be communicatively coupled to network listen circuitry 430 for enabling the HNB to sniff the air interface from a neighboring cell such as a macro cell (not illustrated), in order to gather aiding information related to that air interface, as discussed below. Although the illustrated example shows separate antennas corresponding to the network listen circuitry 430 and the WWAN layer 423, in some examples the WWAN PHY 423 and the network listen circuitry 430 may share the same antenna.

In accordance with various aspects of the present disclosure, to reduce network acquisition time for the UE 410 within a wireless network, the HNB 420 may gather certain aiding information from the cellular network by utilizing the network listen circuitry 430. Further, the aiding information may be obtained by the HNB 420 from the core network by utilizing the network interface to the core network 350 (see FIG. 3). The HNB 420 may provide this aiding information to the UE 410 over a low-power, out-of-band radio link. Here, an out-of-band radio link is generally a radio link communicating over a channel in a different band than that of the WWAN link 440. In one example, the out-of-band radio link may be a wireless WPAN interface such as a Bluetooth® interface (Bluetooth is a registered trademark of Bluetooth SIG, Inc.) or any other suitable WPAN interface. Here, an assumption may be that acquisition of the WPAN link 450 is faster than the system acquisition of the WWAN link 440. In various aspects of the disclosure, the provision of the aiding information to the UE 410 may assist the UE 410 in acquiring access to the WWAN over the air interface with a macrocell; in another aspect of the disclosure the provision of the aiding information may assist the UE 410 in acquiring access to the WWAN link 440 over the air interface with the WWAN PHY 423 of the HNB 420.

Whether gathered by the network listen unit 430 or by way of a backhaul connection to the core network, the aiding information from the core network may include information about the air interface with one or more macrocells, including information such as reporting the availability of new cells; public land mobile network (PLMN) information; the received signal code power (RSCP) and ratio of the energy of a reference signal (Ec) to the total received energy (Io) (Ec/Io) values of available cells; neighboring cell ranking information; cell frequency information including carrier frequency, frequency error, and drift rates; timing information; broadcast information including system information blocks (SIBs), e.g., SIBs 3, 11, 7, 12; scrambling codes and/or phases for nearby access nodes, etc. Further, the HNB 420 may share aiding information related specifically to the WWAN link 440 broadcasted by the HNB 420, including RSCP and Ec/Io values, frequency information, timing information, space time transmit diversity (STTD) configuration, SIBs, etc.

In another aspect of the present disclosure, the aiding information from the core network may provide power conservation for an acquiring UE 410 implementing assisted acquisition. That is, by obtaining the aiding information from the HNB 420, the acquiring UE 410 may consume less power than if it had performed an exhaustive scan of one or more frequency bands to discover such information itself. Since the WPAN link 450 used to acquire the aiding information from the HNB 420 may be a short-range or low-power interface, it may consume less power than the WWAN link 440 between the UE 410 and the HNB 420, and may consume substantially less power than a WWAN interface between the UE 410 and a neighboring macrocell (not illustrated). Therefore, power consumption may be conserved and the operational life of the acquiring access terminal may be extended.

Still further power conservation for an acquiring UE 410 may be achieved when the UE 410 utilizes a low-power state. That is, in an aspect of the disclosure, the UE 410, after establishing a WWAN link 440 with the HNB 420, may utilize the HNB 420 as a proxy and enter into a low-power state wherein certain higher power components in the UE 410, such as amplifiers, etc. for the WWAN link 440, are turned off. That is, according to various aspects of the disclosure, the WPAN link 450 may be utilized to obtain the aiding information from the HNB 420 while the UE 410 is in a standard state and while the UE 410 is in the low-power state. Accordingly, the initial calibration and time/frequency adjustments may be performed every time the UE enters into the low power state. Here, the UE 410 may operate in the low power state while in an RRC idle mode and while in an RRC connected mode. That is, the RRC connected mode may be an E-UTRA RRC connected mode, a UTRA RRC connected mode, and/or a GSM connected mode. Further, when a UE 410 is in the UTRA RRC connected mode, it may be in a URA_PCH state, a CELL_PCH state, a CELL_DCH state, or a CELL_FACH state, and the UE 410 may obtain the aiding information over the WPAN link 450 during any one of these states. Further, in the RRC idle mode, the UE 410 may only periodically wake up its modem (e.g., after a discontinuous reception (DRX) cycle ranging from 640 ms to 5120 ms) to monitor pages from the network, make periodic channel measurements, timing and frequency acquisition, inter-frequency and intra-frequency searches, inter-RAT searches, USIM polling, and transmit periodic location updates. Detailed information regarding these modes for a system defined according to 3GPP standards may be found in the 3GPP Radio Resource Control (RRC) Protocol Specification, TS 25.331 V9.1.0, incorporated herein by reference.

In particular, the CELL_FACH state is a state in which a dedicated physical channel for the WWAN link 440 has not been allocated to the UE 410, and the UE 410 utilizes a common transmission channel, although an RRC connection has been established. However, in the CELL_FACH state, the UE 410 can transmit data using a dedicated logical channel. The CELL_FACH state is generally used when the amount of traffic exchanged between the UE 410 and the UTRAN over the WWAN link 440 is small. The UE 410 may receive data while monitoring an FACH and may use an RACH when transmitting data in uplink. When the UE 410 is in the CELL_FACH state, the UE 410 can receive a broadcast channel (BCH) as well as the WPAN link 450 in order to obtain the aiding information.

The HNB 420 may receive paging messages or other information from the core network by way of one or more of the network listen circuitry 430 or the backhaul connection to the Internet. Entering into the low-power state may cause the UE 410 to lose its timing and frequency information, because it may be unable to perform channel measurements and other acquisition and measurement functions. In an aspect of the disclosure, the UE 410 may wake up periodically from the low-power state (e.g., may enter into a standard state in the RRC idle mode or the RRC connected mode) and retrieve the aiding information over the WWAN or WPAN links in order to perform initial calibration and time/frequency adjustments. However, in order to save power, in another aspect of the disclosure, the UE 410 may remain in the low-power state for longer periods of time, and may acquire the aiding information from the HNB 420 over the WPAN link 450 while in the low-power state, to be utilized at a later time to perform initial calibration and time/frequency adjustments. In yet another aspect of the disclosure, the HNB 420 may provide a wake-up indicator to the UE 410 over the WPAN link 450 for instructing the UE 410 to wake up from the low-power state. Here, the HNB 420 may provide an aiding information message providing the UE 410 with various aiding information as a part of the wake-up indicator and/or in a separate message distinct from the wake-up indicator.

Thus, according to various aspects of the disclosure, the WPAN link 450 may be utilized to provide aiding information from the HNB 420 to the UE 410 while the UE 410 is in a standard or low-power state, either of which may occur in an RRC connected mode and an RRC idle mode. Here, the low-power state may be any suitable operating state adapted for saving power in the UE 410.

Conventionally, system acquisition is often done by a UE sequentially scanning all channels within one or more frequency bands. That is, when the UE 410 is first turned on, it may read the PLMN and International Mobile Subscriber Identity (IMSI) information stored in a subscriber identity module (SIM) card in the UE 410. An IMSI may be assigned by the service provider to a UE (subscriber) as a permanent ID associated with its subscription. Upon startup, the UE 410 typically reads its stored PLMN information from its SIM and begins system acquisition. Such system acquisition often involves a frequency scan followed by an acquisition scan. Although frequency and acquisition scans algorithms are implementation dependent, the UE 410 may first attempt system acquisition using its PLMN information stored in its SIM (e.g., typically its home PLMN or last known PLMN information). If no suitable cell or NB is found using this PLMN information, the UE 410 may extend its scan by implementing a frequency scanning algorithm in which frequency bands for its Radio Resource Control are exhaustively searched to try to identify all PLMNs within radio contact. A frequency scanning algorithm may involve a coarse frequency scan followed by a fine frequency scan.

During the coarse frequency scan, a wide frequency band is coarsely scanned by detecting carrier power at regular intervals to identify potential NB (cell) narrow frequency bands. In the fine frequency scan, the identified potential access node frequency bands are scanned at finer intervals to identify particular channels. The frequency scanning algorithm may also adjust its power detection threshold in an attempt to identify reference signals from NBs or cells. An acquisition scan is then performed where the UE 410 searches the identified channels in frequency and code space to acquire a scrambling code and phase for the NB (cell) which it can use for communications over the wireless network. The average acquisition time is a function of the number of the frequency bands searched, number of frequency assignments in each band, number of codes searched, channel conditions, and strength of reference signals from local NBs (cells). Because such scanning may involve several hundred searches, this results in a noticeable delay and power consumption for a UE.

In an aspect of the disclosure, a UE 410 with no prior knowledge of network information may utilize a secondary communication interface, e.g., WPAN circuitry 414, 415, to obtain such network information over a WPAN link 450 from a HNB 420 acting as a proxy. Here, the HNB 420 may have aiding information about the network to speed up the system acquisition process. For example, the UE 410 may obtain aiding information from the HNB 420, which may already be registered on the network. In one example, the UE 410 may have no prior knowledge of a wireless network it intends to join. However, the HNB 420, acting as a proxy for the UE 410, may already have obtained wireless network information (e.g., identified access nodes, communication frequencies, channels, timing, scrambling codes and/or phases, etc) by way of network listen circuitry 430 and/or a backhaul connection to the core network, e.g., by way of the Internet.

The UE 410 and the HNB 420 may include WWAN circuitry 412, 413 and 422, 423 for providing a WWAN link 440, and WPAN circuitry 414, 415 and 424, 425 (e.g., Bluetooth-compliant) for providing a WPAN link 450. WWAN circuitry may support a UMTS compliant interface, cdma2000, WiMax, LTE, etc., which serves to provide a communication interface with a wireless network (e.g., a UTRAN). The wireless network may be a managed network where a network controller facilitates communications to/from UEs via one or more base stations. WPAN circuitry may support a short range communication interface, such as a Bluetooth interface, that may facilitate, for example, peer-to-peer communications. A WPAN link 450 established by the WPAN circuitry may not be associated with the wireless network.

Upon starting up and not finding its expected home network via its WWAN circuitry 412, 413, the UE 410 may scan for the HNB 420 via its WPAN circuitry 414, 415. Alternatively, the UE 410 and HNB 420 may have a pre-established association or there may be a pre-established WPAN link 450 between their respective WPAN circuitry 414, 415 and 424, 425. In this example, HNB 420 may have already acquired network information for the wireless network used by WWAN circuitry 412, 413. The UE 410 may find the HNB 420 within range of its WPAN circuitry 414, 415. The UE 410 may then obtain network information from the HNB 420 via a WPAN link 450 between the respective WPAN circuitry 414, 415 and 424, 425. Such network information may include, for example, a list of PLMNs active in the area or region, a list of the offset frequencies relative to the short range link reference frequency (e.g., the offset frequencies identifying frequencies associated with one or more access nodes, base stations, etc.), and other time and/or code information (e.g., associated with one or more access nodes, base stations, etc.) that may be used to speed up the cell acquisition process. Using such network information, the UE 410 may acquire service via the WWAN link 440, for example.

In some implementations, the UE 410 may be a multi-mode device capable of communicating over different types of networks (e.g., CDMA, GSM, etc.). That is, the WWAN circuitry 412, 413 may be capable of communicating over a plurality of air interfaces. Alternatively, the UE 410 may include additional network interfaces for the different types of networks. Consequently, the network information obtained from the HNB 420 via the WPAN link 450 link may be specific for a particular type of wireless network (e.g., GSM, CDMA, etc.), specific to one or more networks associated with a particular service provider, and/or general to all networks that may be locally available in that region and known to the HNB 420.

Another feature of obtaining the network information from the HNB 420 is that the UE 410 may consume less power than if it had performed an exhaustive scan of one or more frequency bands utilizing its WWAN circuitry 412, 413 to discover such information itself. Since the WPAN circuitry 414, 415 may be a short-range or low-power interface, it may consume less power than the WWAN circuitry 412, 413 (which may be used for longer range communications). Therefore, power consumption may be conserved and the operational life of the UE 410 may be extended. This may be particularly useful where the UE 410 is powered by batteries, for example, since it means that the device can operate for longer periods of time between recharging.

Figure 5:
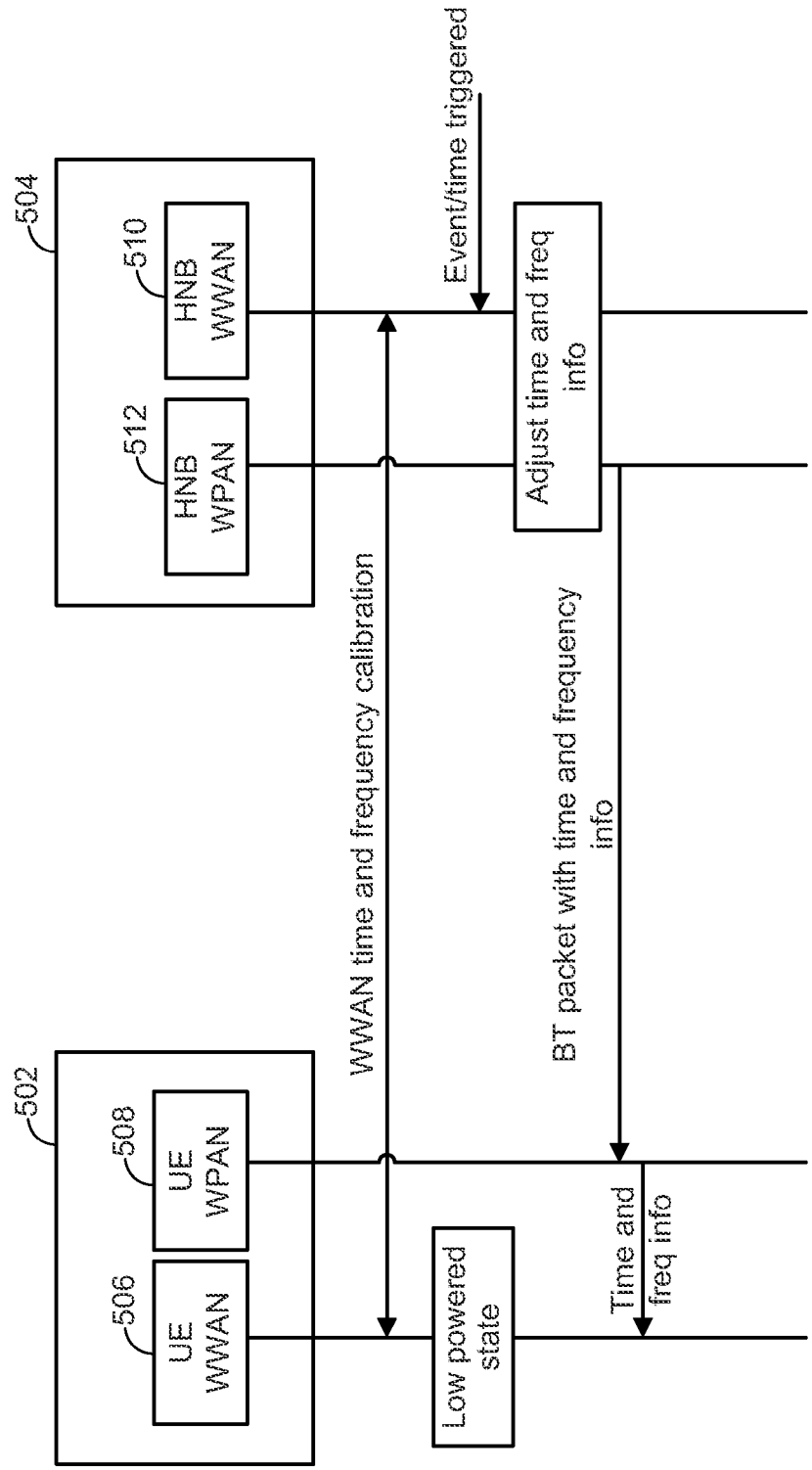
FIG. 5 is a call flow diagram illustrating a process according to one aspect of the disclosure.
Figure 6:
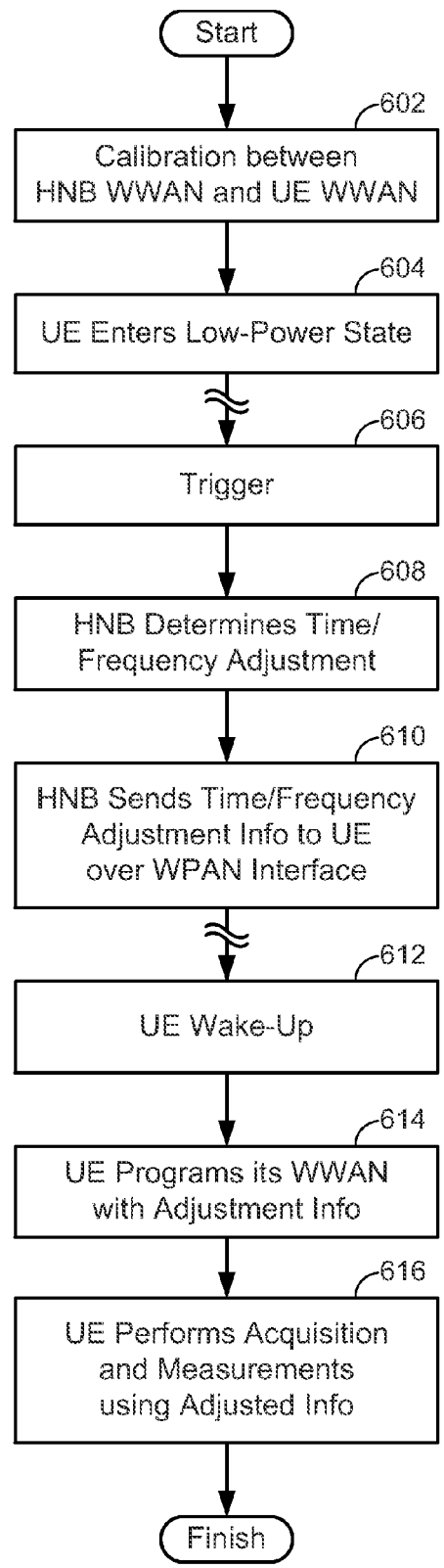
FIG. 6 is a flow chart further illustrating the process of FIG. 5.

FIG. 5 is a call flow diagram illustrating an exemplary process for exchanging information between a UE 502 acting as a client for a HNB 504, and the HNB 504 acting as a proxy for the UE 502, in order to provide aiding information such as time and frequency calibration data to the UE 502. FIG. 6 is a flow chart illustrating the same exemplary process. In some examples, the UE 502 may be the UE 410 illustrated in FIG. 4, and may include the processing system illustrated in FIG. 1; similarly, the HNB 504 may be the HNB 420 illustrated in FIG. 4 and may include the processing system illustrated in FIG. 1. Of course, in other examples, the UE 502 may be any suitable mobile device and the HNB 504 may be any suitable femtocell unit, as described above. Here, the UE 502 includes a first radio 506 and a second radio 508. For example, the first radio 506 of the UE 502 may be circuitry for providing a communication channel with the HNB 504. Here, a communication channel may include any suitable radio channel or channels for propagating voice, data, and/or control information between the HNB 504 and the UE 502. In one example, the first radio may be a WWAN interface for providing a WWAN link with the femtocell unit 504, with a macrocell (not illustrated), or with any other radio capable of communicating over the respective WWAN link. Further, the second radio 508 of the UE 502 may be circuitry enabling a WPAN link with the femtocell unit 504, or with any other radio capable of communicating over the respective WPAN link. Further, the HNB 504 may include a first radio 510 and a second radio 512. For example, the first radio 510 of the HNB 504 may be circuitry enabling a WWAN link with the UE 502 or with any other radio capable of communicating over the respective WWAN link. Further, the second radio 512 of the HNB 504 may be circuitry enabling a WPAN link with the UE 502, or with any other radio capable of communicating over the respective WPAN link.

In block 602 (see FIG. 6), the process executes a calibration between the first radio 506 of the UE 502 and the first radio 510 of the HNB 504. Here, the calibration may include exchanging information between the UE 502 and the HNB 504, where the information may include time and/or frequency calibration information for synchronizing the timing and/or the frequency of communication over the WWAN link.

In block 604, the UE 502 enters into a low-power state. In an aspect of the disclosure, block 604 may be skipped in the process; that is, the following steps including the adjustment or re-calibration of the UE 502 may be performed in essentially any mode including an active mode, a connected mode, and/or a CELL_FACH state. When the UE 502 enters into the low-power state as illustrated in block 604, the UE 502 may use less power and may have an extended battery life.

In block 606, a trigger event may occur in the HNB 504. For example, a trigger event may occur regularly at the expiry of a timer designated for the trigger. In another example, the trigger event may occur upon a change in system information as determined by the HNB 504. For example, as illustrated in FIG. 4, the HNB 420 may include a network listen module 430, with which the HNB 420 may intermittently, periodically, or continuously monitor for and gather system information from one or more neighboring cells. Further, the HNB 420 may include a backhaul interface to the core network (see FIG. 3). For example, aiding information that the HNB 420 may gather utilizing the network listen module and/or the backhaul interface may include the reporting of new cells when they are deployed or available; neighboring cell and femtocell received signal code power (RSCP) and/or reference signal strength information such as an Ec/Io value (absolute or differential); neighboring cell ranking information, e.g., ranking of the reference signal strength information from a number of neighboring cells; cell frequency information, e.g., carrier frequency, frequency error, and drift rates; timing information, e.g., absolute timing, differential timing (e.g., between the WAN and PAN of the HNB, or between the HNB and a macrocell or other external entity), or timing drift; space time transmit diversity (STTD) configuration of the HNB; or broadcast information, e.g., system information blocks (SIBs, e.g., SIB 3, 11, 7, 12, etc.). Thus, in an aspect of the disclosure, the trigger event 606 may occur when the HNB 504 receives aiding information and/or an update to the network information discussed above.

In another example according to some aspects of the disclosure, the trigger event 606 may be a request from the UE 502 for aiding information such as a timing update, etc. Here, when the UE 502 provides a request for aiding information, the request may broadcasted from the UE 502 utilizing the second radio 508 (e.g., using the WPAN air interface), requesting aiding information from any nearby device including, but not limited to, the femtocell or HNB 504. Alternately or additionally, the request for aiding information may be provided as a dedicated message to the HNB 504 utilizing the second radio 508 (e.g., the WPAN air interface) in a request message addressed specifically to the HNB 504 with which the UE 502 has previously established communication.

In block 608, the HNB 504 may determine that the UE 502 should be notified that an adjustment is warranted. For example, when a change corresponding to timing and/or frequency adjustment is warranted, the HNB 504 may determine aiding information corresponding to the timing and/or frequency adjustment to be provided to the UE 502. Thus, in block 610, the HNB 504 may transmit the aiding information determined in block 608 to the UE 502 utilizing the second radio 512 (e.g., the WPAN interface). In some aspects of the disclosure, the aiding information may be provided to the UE 502 utilizing a suitable channel over the WWAN link. When the aiding information is provided over the WPAN link, the UE 502 may receive this aiding information utilizing its second radio 508 (e.g., its WPAN interface). Here, the UE 502 may be in the standard or low-power state as discussed above with relation to block 604.

According to some aspects of the disclosure, when the UE 502 is in a low-power state, the UE 502 may store the aiding information received over the WWAN link or the WPAN link in a memory suitable for access upon wake-up form the low-power state. That is, the adjustment information may not be utilized for adjustment while the UE is in the low-power state. According to some other aspects of the disclosure, the UE 502 may utilize the adjustment information when it is received, that is, whether the UE 502 is in a standard or low-power state.

In block 612, the UE 502 may wake up from the low-power state. That is, in an aspect of the disclosure in which the UE 502 entered into the low-power state in block 604, the UE 502 may wake up from the low-power state in order to utilize the first radio 506 (e.g., the WWAN interface) to communicate with the HNB 504, for example. In any case, whether after a wake-up 612 or just after receiving the aiding information, circuitry in the UE 502 corresponding to the second radio 508 (e.g., the WPAN interface) provides the received aiding information to circuitry corresponding to the first radio 506 (e.g., the WWAN interface) such that the circuitry corresponding to the first radio 506 may be adjusted or reconfigured in accordance with the aiding information. In various aspects of the disclosure, the process in blocks 606-614 may repeat any number of times between a sleep and a wake-up of the UE 502. In block 616, the UE performs acquisition and measurement of the air interface corresponding to the first radio 506 (e.g., the WWAN interface) utilizing the aiding information provided from the HNB 504.

In this way, the UE 502 may be capable of improved performance, for example, faster acquisition of the link with the first radio 506 based on the availability of the system information at wake-up. Thus, a UE 502 that utilizes the low-power state may remain in this state for a more extended period of time. Further, any delay in acquisition of the link with the first radio (e.g., the WWAN) associated with acquisition and measurement may be reduced, improving responsiveness of the UE 502. Thus, upon acquisition of the WWAN link, the UE 502 may establish a connection utilizing the first radio. Here, a connection may include a data call, a voice call, or any other WWAN call utilizing a protocol such as those defined in standards promulgated by the 3GPP, 3GPP2, IEEE, etc. That is, when the UE 502 establishes a connection with the network corresponding to the cell, the UE 502 may be utilizing the WWAN of the HNB 504. The HNB 504 may provide communication with the network by way of the backhaul connection to the core network utilizing the Internet, or alternately, may communicate over an air interface with the cell.

Figure 7:
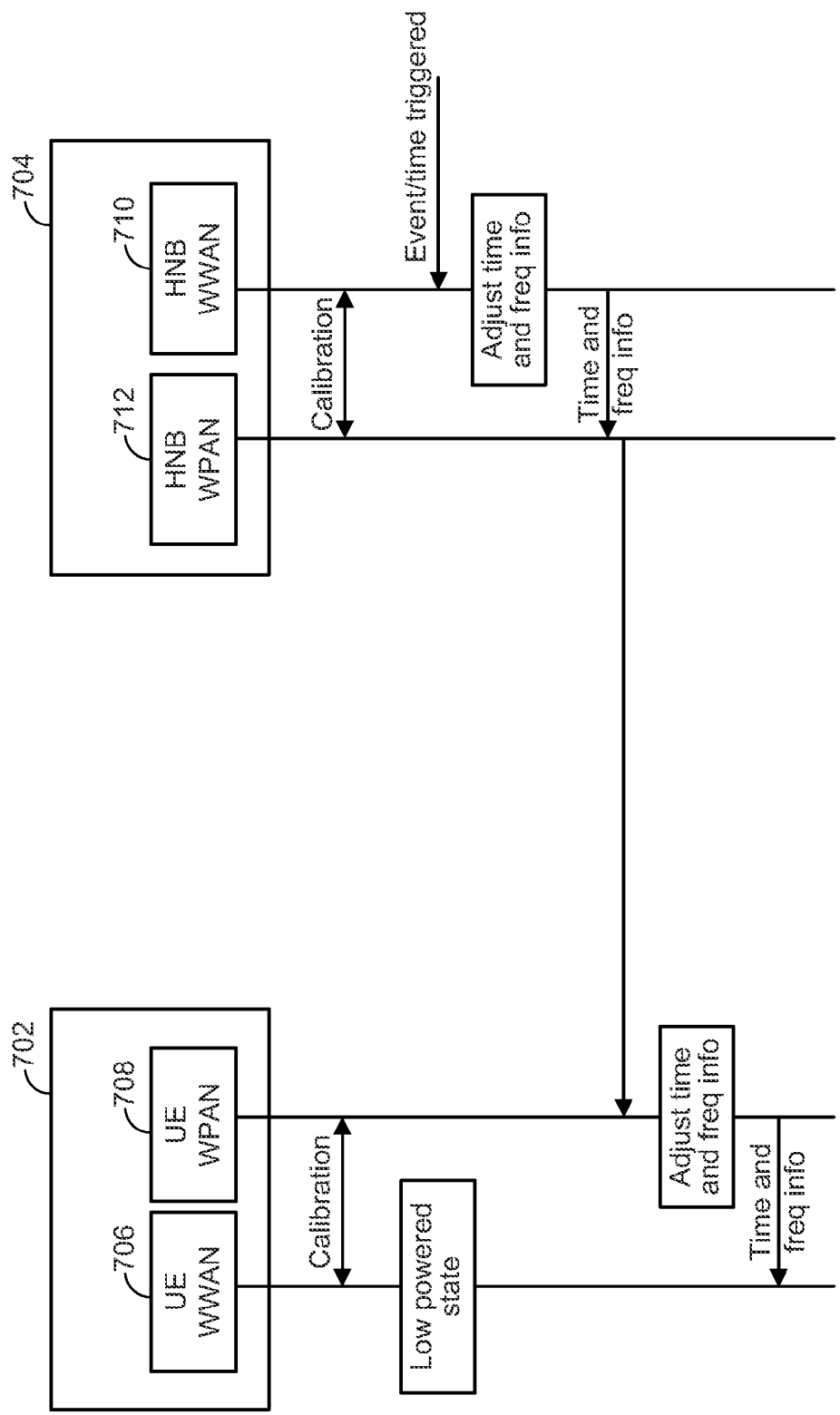
FIG. 7 is a call flow diagram illustrating another process according to an aspect of the disclosure.
Figure 8:
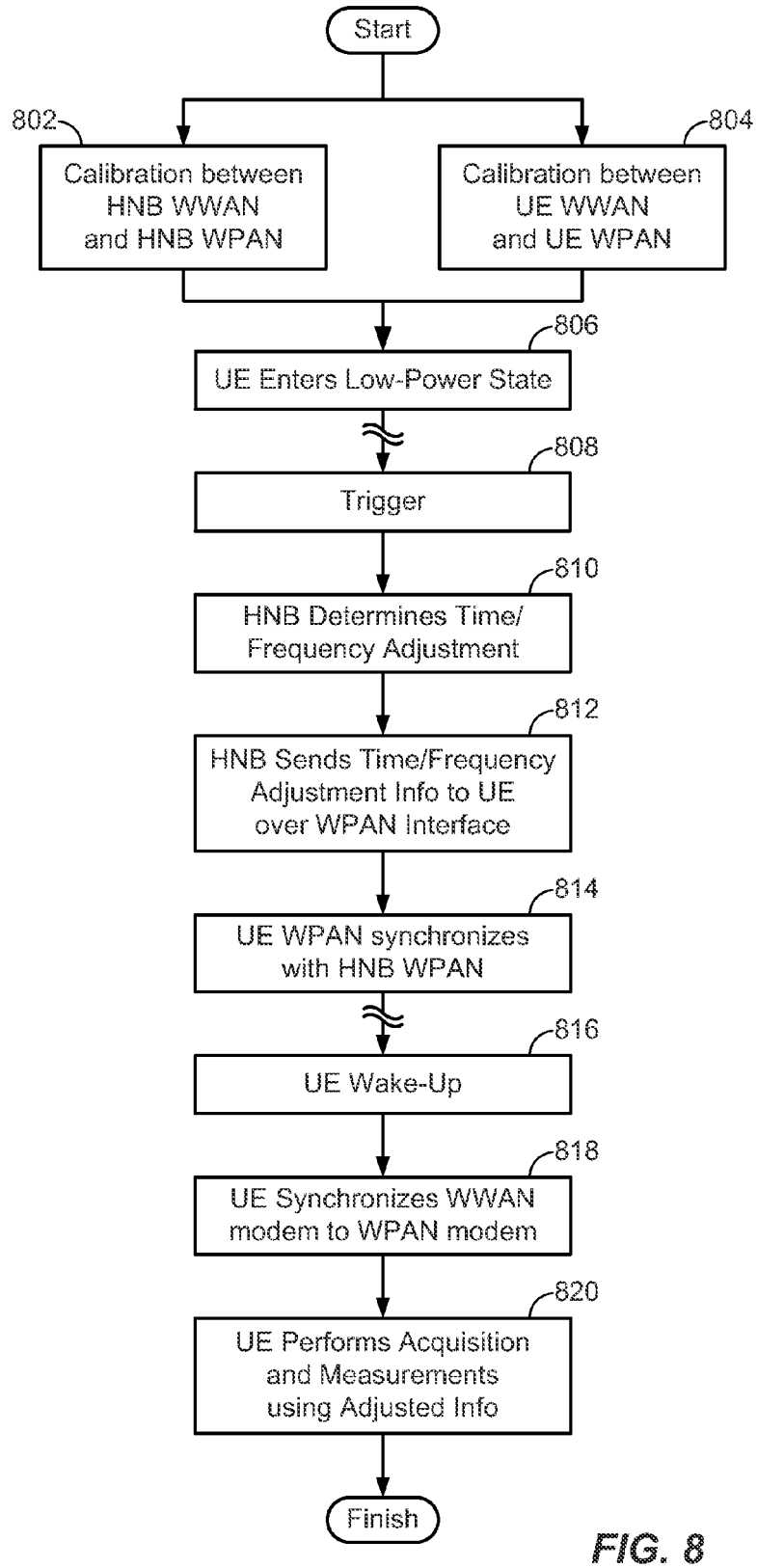
FIG. 8 is a flow chart further illustrating the process of FIG. 7.

FIG. 7 is a call flow diagram illustrating another aspect of the disclosure for exchanging information between a UE 702 and a HNB 704. FIG. 8 is a flow chart illustrating the same exemplary process. Because a number of the components and process steps described herein are the same as those discussed above with respect to FIGS. 6-7, some of those that are the same are not discussed herein in detail. Here, the UE 702 may include a first radio 706 (e.g., a WWAN interface) and a second radio 708 (e.g., a WPAN interface). Similarly, the HNB 704 may include a first radio 710 (e.g., a WWAN interface) and a second radio 712 (e.g., a WPAN interface).

In block 802 (see FIG. 8), the process performs a calibration in the UE 702 between circuitry corresponding to the first radio 706 (e.g., the WWAN interface) and circuitry corresponding to the second radio 708 (e.g., the WPAN interface). For example, the calibration may be a calibration of respective clocks corresponding to the first and second radios 706 and 708. Similarly, in block 804, the process performs a calibration in the HNB 704 between circuitry corresponding to the first radio 710 (e.g., the WWAN interface) and circuitry corresponding to the second radio 712 (e.g., the WPAN interface). For example, the calibration may be a calibration of respective clocks corresponding to the first and second radios 710 and 712. In an aspect of the disclosure, as the first and second radios 706 and 708 of the UE are in the same unit, they may share the same clock, and in this case, the calibration step 802 may be omitted. Similarly, the first and second radios 710 and 712 of the HNB 704 are in the same unit, and they may also share a clock, and in this case, the calibration step 804 may be omitted.

In block 806, the UE 702 enters the low-power state. Again, as the UE 702 may be configured to receive system or adjustment information during essentially any mode or state, step 806 is optional and may be eliminated from a process in accordance with some aspects of the disclosure. In block 808, a trigger event may occur in the HNB 704. Upon the happening of the trigger event, the process may move to block 810, in which the HNB 704 may determine that the UE 502 should be notified that an adjustment is warranted. For example, when the adjustment corresponds to a change in time and/or frequency information corresponding to the WWAN air interface, circuitry corresponding to the first radio 710 (e.g., the WWAN interface) of the HNB 704 provides this aiding information to circuitry corresponding to the second radio 712 (e.g., the WPAN interface) of the HNB 704. In an aspect of the disclosure, where the circuitry corresponding to the first radio 710 and the circuitry corresponding to the second radio 712 share a clock, and where the aiding information corresponds to a change in timing information, an adjustment of the clock corresponding to the first radio 710 in response to the trigger event 808 may automatically adjust the clock corresponding to the second radio 712. Thus, in block 812, the HNB 704 may transmit the aiding information determined in block 810 to the UE 702 utilizing the second radio 712 (e.g., the WPAN interface). The UE 702 may receive this information utilizing its second radio 708 (e.g., its WPAN interface). Here, circuitry in the UE 702 corresponding to the second radio 708 provides the received adjustment information to circuitry corresponding to the first radio 706 such that the circuitry corresponding to the first radio 706 may be adjusted or reconfigured in accordance with the aiding information. The UE 702 may receive this aiding information utilizing its second radio 708. In block 814, circuitry corresponding to the second radio 708 in the UE 702 responds to the aiding information. Here, when the aiding information corresponds to timing information, the circuitry corresponding to the second radio 708 (e.g., the WPAN interface) of the UE 702 is synchronized with the clock in the HNB 704 responsive to the timing information. In an example where the aiding information corresponds to timing information and where the circuitry corresponding to the first radio 706 in the UE 702 shares a clock with the circuitry corresponding to the second radio 708 in the UE 702, an adjustment of the clock for the second radio 708 in response to the timing information may automatically affect the timing of the circuitry corresponding to the first radio 706.

In block 816, the UE may wake up from the low-power state. In block 818, the UE 702 may provide any aiding information received by the second radio 708 to circuitry corresponding to the first radio 706 of the UE 702. For example, when the aiding information is timing information, the circuitry corresponding to the second radio 708 may provide the received timing information to the circuitry corresponding to the first radio 706 in the UE 702. In block 820, the UE performs acquisition and measurement of the air interface corresponding to the first radio 706 (e.g., the WWAN interface) utilizing the aiding information provided from the HNB 704.

While the specification describes particular examples of the present invention, those of ordinary skill can devise variations of the present invention without departing from the inventive concept. For example, while certain teachings herein may refer to circuit-switched network elements they are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of wireless communication operational on an access point comprising a first radio for communication via a wireless wide area network (WWAN) and a second radio, the method comprising:
    performing an initial calibration corresponding to the first radio by exchanging information with a user equipment (UE) using the first radio;
    acting as a proxy for the UE by gathering system information corresponding to the first radio from one or more neighboring cells including utilizing a WWAN network interface to obtain the timing and/or frequency information from the one or more neighboring cells in the WWAN network corresponding to the first radio for the UE while the UE is in a low-power state, wherein, in response to a trigger, the access point determines an adjustment of the timing and/or frequency information corresponding to the first radio from the one or more neighboring cells as the proxy for the UE, wherein the trigger comprises at least one of expiration of a timer, a change in system information, and a request from the UE, wherein the WWAN network interface of the access point comprises one of:
        network listen circuitry for sniffing an WWAN air interface corresponding to at least one neighboring cell in the WWAN network in order to obtain the frequency and/or timing information for the WWAN network as the proxy for the UE while the UE is in the low-power state; or
        a backhaul connection configured for utilizing an Internet connection to communicate with the WWAN network in order to obtain the frequency and/or timing information for the WWAN network as the proxy for the UE while the UE is in the low-power state; and
    transmitting, utilizing the second radio, aiding information corresponding at least in part to the adjustment of timing, frequency error, and drift rate information for the first radio to the UE for communication via the WWAN, wherein the aiding information is part of a wake-up indicator to wake up the UE from the low-power state, with the low-power state being a non-zero power state.

2. The method of claim 1, wherein the aiding information is configured to be used by the UE to adjust a first wireless link between the first radio at the access point and a corresponding first radio at the UE; and
    wherein the method further comprises communicating with the UE over the first wireless link adjusted in accordance with the aiding information.

3. The method of claim 1, wherein performing the initial calibration comprises:
    exchanging information with the UE utilizing the first radio to calibrate timing and/or frequency information between the first radio at the access point and a corresponding first radio at the UE.

4. The method of claim 3,
    wherein the determining an adjustment of timing and/or frequency information corresponding to the first radio comprises determining a change relative to the timing and/or frequency information corresponding to the initial calibration; and
    wherein the transmitting aiding information comprises transmitting information corresponding to the change.

5. The method of claim 1, wherein performing the initial calibration comprises:
    exchanging information between the first radio and the second radio at the access point, to calibrate timing and/or frequency information between the first radio and the second radio at the access point.

6. The method of claim 5,
    wherein the determining an adjustment of timing and/or frequency information corresponding to the first radio comprises determining a change relative to the timing and/or frequency information corresponding to the initial calibration,
    the method further comprising sending information corresponding to the change from the first radio to the second radio of the access point, wherein the transmitting aiding information comprises transmitting the information corresponding to the change.

7. The method of claim 1, wherein the aiding information further comprises at least one of: channel measurements corresponding to an air interface with at least one cell; frequency information corresponding to the air interface with the at least one cell; a strength of a reference signal from the at least one cell; ranking information of reference signals from a plurality of cells in a network corresponding to the first radio; absolute timing corresponding to the first radio; differential timing corresponding to a difference in timing between the first radio and the second radio at the access point; absolute timing of a neighboring cell in the network; or differential timing corresponding to a difference in timing between the first radio and a neighboring cell in the network.

8. The method of claim 1, wherein the trigger comprises: receiving, utilizing the second radio, a request from the UE to provide to the user equipment over a second wireless link the aiding information for adjusting a first wireless link.

9. The method of claim 1, wherein the trigger corresponds to a predetermined timing.

10. The method of claim 1, wherein the first radio is configured to provide a WWAN link.

11. The method of claim 1, wherein the second radio is configured to provide at least one of: a low-power radio link, or an out-of-band radio link.

12. A method of wireless communication operational on a wireless user equipment (UE) comprising a first radio for communication via a wireless wide area network (WWAN) and a second radio, the method comprising:
  performing an initial calibration corresponding to the first radio by exchanging information with an access point utilizing the first radio to calibrate timing and/or frequency information between the first radio at the UE and a corresponding first radio at the access point;
  entering a low-power state;
  receiving, utilizing the second radio, aiding information for communication via the WWAN to perform another initial calibration at a later time, the aiding information corresponding at least in part to an adjustment of timing, frequency error, and drift rate information for the first radio while the UE is in a low-power state, with the low-power state being a non-zero power state, wherein the UE receives an adjustment of the timing and/or frequency information corresponding to the first radio from the one or more neighboring cells as a proxy for the UE, wherein the adjustment of the timing and/or frequency information corresponds to a change relative to the timing and/or frequency information corresponding to the initial calibration, in response to a trigger comprising at least one of expiration of a timer, a change in system information, and a request from the UE, wherein the aiding information is received as at least one of:
    a periodic communication of aiding information,
    aiding information communication sent separately from a wake up indicator, and
    a response to a request from the UE for the aiding information;
  adjusting the timing and/or frequency information for the second radio at the UE in response to receiving the aiding information from the access point; and
  sending information corresponding to the adjustment of timing and/or frequency information from the second radio at the UE to the first radio at the UE to calibrate the timing and/or frequency information between the first radio and the second radio at the UE.

13. The method of claim 12, further comprising:
  adjusting a first wireless link between the first radio and a corresponding first radio at the access point; and
  communicating with the access point over the first wireless link adjusted in accordance with the aiding information.

14. The method of claim 12, wherein the adjustment of the timing and/or frequency information corresponds to a change relative to the timing and/or frequency information corresponding to the initial calibration.

15. An access point configured for wireless communication, comprising:
  at least one processor;
  a computer-readable medium communicatively coupled to the at least one processor; a first radio for communication via a wireless wide area network (WWAN) communicatively coupled to the at least one processor; and
  a second radio communicatively coupled to the at least one processor, wherein the at least one processor is configured to:
  perform an initial calibration corresponding to the first radio by exchanging information with a user equipment (UE) using the first radio;
  act as a proxy for the UE by gathering system information corresponding to the first radio from one or more neighboring cells including utilizing a WWAN network interface to obtain the timing and/or frequency information from the one or more neighboring cells in the WWAN network corresponding to the first radio for the UE while the UE is in a low-power state, wherein, in response to a trigger, the access point determines an adjustment of the timing and/or frequency information corresponding to the first radio from the one or more neighboring cells as the proxy for the UE, wherein the trigger comprises at least one of expiration of a timer, a change in system information, and a request from the UE, wherein the WWAN network interface access point comprises one of:
  network listen circuitry for sniffing an WWAN air interface corresponding to at least one neighboring cell in the WWAN network in order to obtain the frequency and/or timing information for the WWAN network as the proxy for the UE while the UE is in the low-power state; or
  a backhaul connection configured for utilizing an Internet connection to communicate with the WWAN network in order to obtain the frequency and/or timing information for the WWAN network as the proxy for the UE while the UE is in the low-power state; and
  transmit, utilizing the second radio, aiding information corresponding at least in part to the adjustment of timing, frequency error, and drift rate information for the first radio to a UE for communication via the WWAN, wherein the aiding information is part of a wake-up indicator to wake up the UE from the low-power state, with the low-power state being a non-zero power state.

16. The access point of claim 15, wherein the aiding information is configured to be used by the UE to adjust a first wireless link between the first radio at the access point and a corresponding first radio at the UE; and
  wherein the at least one processor is further configured to communicate with the UE over the first wireless link adjusted in accordance with the aiding information.

17. The access point of claim 15, wherein the at least one processor, being configured to perform the initial calibration, is further configured to exchange information with the UE utilizing the first radio to calibrate timing and/or frequency information between the first radio at the access point and a corresponding first radio at the UE.

18. The access point of claim 17,
wherein the at least one processor, being configured to determine an adjustment of timing and/or frequency information corresponding to the first radio, is further configured to determine a change relative to the timing and/or frequency information corresponding to the initial calibration; and
wherein the at least one processor, being configured to transmit aiding information, is further configured to transmit information corresponding to the change.

19. The access point of claim 15, wherein the at least one processor, being configured to perform the initial calibration, is further configured to exchange information between the first radio and the second radio at the access point, to calibrate timing and/or frequency information between the first radio and the second radio at the access point.

20. The access point of claim 19,
wherein the at least one processor, being configured to determine an adjustment of timing and/or frequency information corresponding to the first radio, is further configured to determine a change relative to the timing and/or frequency information corresponding to the initial calibration,
wherein the at least one processor is further configured to send information corresponding to the change from the first radio to the second radio of the access point,
wherein the at least one processor, being configured to transmit aiding information, is further configured to transmit the information corresponding to the change.

21. The access point of claim 15, wherein the aiding information further comprises at least one of: channel measurements corresponding to an air interface with at least one cell; frequency information corresponding to the air interface with the at least one cell; a strength of a reference signal from the at least one cell; ranking information of reference signals from a plurality of cells in a network corresponding to the first radio; absolute timing corresponding to the first radio; differential timing corresponding to a difference in timing between the first radio and the second radio at the access point; absolute timing of a neighboring cell in the network; or differential timing corresponding to a difference in timing between the first radio and a neighboring cell in the network.

22. The access point of claim 15, wherein the trigger comprises: receiving, utilizing the second radio, a request from the UE to provide to the user equipment over a second wireless link the aiding information for adjusting a first wireless link.

23. The access point of claim 15, wherein the trigger corresponds to a predetermined timing.

24. The access point of claim 15, wherein the first radio is configured to provide a WWAN link.

25. The access point of claim 15, wherein the second radio is configured to provide at least one of: a low-power radio link, or an out-of-band radio link.

26. A user equipment (UE) configured for wireless communication, comprising:
at least one processor;
a computer-readable medium communicatively coupled to the at least one processor; a first radio for communication via a wireless wide area network (WWAN) communicatively coupled to the at least one processor; and
a second radio communicatively coupled to the at least one processor, wherein the at least one processor is configured to:
perform an initial calibration corresponding to the first radio; enter a low-power state; and
receiving, utilizing the second radio, aiding information for communication via the WWAN to perform another initial calibration at a later time, the aiding information corresponding at least in part to an adjustment of timing, frequency error, and drift rate information for the first radio while the UE is in a low-power state, with the low-power state being a non-zero power state, wherein the UE receives an adjustment of the timing and/or frequency information corresponding to the first radio from the one or more neighboring cells as a proxy for the UE, wherein the adjustment of the timing and/or frequency information corresponds to a change relative to the timing and/or frequency information corresponding to the initial calibration, in response to a trigger comprising at least one of expiration of a timer, a change in system information, and a request from the UE, wherein the aiding information is received as at least one of:
a periodic communication of aiding information,
aiding information communication sent separately from a wake up indicator, and
a response to a request from the UE for the aiding information;
adjusting the timing and/or frequency information for the second radio at the UE in response to receiving the aiding information from the access point; and
sending information corresponding to the adjustment of timing and/or frequency information from the second radio at the UE to the first radio at the UE to calibrate the timing and/or frequency information between the first radio and the second radio at the UE.

27. The UE of claim 26, wherein the at least one processor is further configured to:
adjust a first wireless link between the first radio and a corresponding first radio at the access point; and
communicate with the access point over the first wireless link adjusted in accordance with the aiding information.

28. The UE of claim 26, wherein the adjustment of the timing and/or frequency information corresponds to a change relative to the timing and/or frequency information corresponding to the initial calibration.

29. An access point configured for wireless communication, comprising:
a first radio for communication via a wireless wide area network (WWAN);
a second radio;
means for performing an initial calibration corresponding to the first radio by exchanging information with a user equipment (UE) using the first radio;
means for acting as a proxy for the UE by gathering system information corresponding to the first radio from one or more neighboring cells including utilizing a WWAN network interface to obtain the timing and/or frequency information from the one or more neighboring cells in the WWAN network corresponding to the first radio for the UE while the UE is in a low-power state, wherein, in response to a trigger, the access point determines an adjustment of the timing and/or frequency information corresponding to the first radio from the one or more neighboring cells as the proxy for the UE, wherein the trigger comprises at least one of expiration of a timer, a change in system information, and a request from the UE, wherein the WWAN network interface of the access point comprises one of:
network listen circuitry for sniffing an WWAN air interface corresponding to at least one neighboring cell in the WWAN network in order to obtain the frequency and/or timing information for the WWAN network as the proxy for the UE while the UE is in the low-power state; or a backhaul connection configured for utilizing an Internet connection to communicate with the WWAN network in order to obtain the frequency and/or timing information for the WWAN network as the proxy for the UE while the UE is in the low-power state; and
means for transmitting, utilizing the second radio, aiding information corresponding at least in part to the adjustment of timing, frequency error, and drift rate information for the first radio to the UE for communication via the WWAN, wherein the aiding information is part of a wake-up indicator to wake up the UE from the low-power state, with the low-power state being a non-zero power state.

30. The access point of claim 29, wherein the aiding information is configured to be used by the UE to adjust a first wireless link between the first radio at the access point and a corresponding first radio at the UE; and
wherein the access point further comprises means for communicating with the UE over the first wireless link adjusted in accordance with the aiding information.

31. The access point of claim 29, wherein the means for performing the initial calibration is further configured to exchange information with the UE utilizing the first radio to calibrate timing and/or frequency information between the first radio at the access point and a corresponding first radio at the UE.

32. The access point of claim 31,
wherein the means for determining an adjustment of timing and/or frequency information corresponding to the first radio is further configured to determine a change relative to the timing and/or frequency information corresponding to the initial calibration; and
wherein the means for transmitting aiding information is further configured to transmit information corresponding to the change.

33. The access point of claim 29, wherein the means for performing the initial calibration is further configured to exchange information between the first radio and the second radio at the access point, to calibrate timing and/or frequency information between the first radio and the second radio at the access point.

34. The access point of claim 33,
wherein the means for determining an adjustment of timing and/or frequency information corresponding to the first radio is further configured to determine a change relative to the timing and/or frequency information corresponding to the initial calibration,
the access point further comprising means for sending information corresponding to the change from the first radio to the second radio of the access point,
wherein the means for transmitting aiding information is further configured to transmit the information corresponding to the change.

35. The access point of claim 29, wherein the aiding information further comprises at least one of: channel measurements corresponding to an air interface with at least one cell; frequency information corresponding to the air interface with the at least one cell; a strength of a reference signal from the at least one cell; ranking information of reference signals from a plurality of cells in a network corresponding to the first radio; absolute timing corresponding to the first radio; differential timing corresponding to a difference in timing between the first radio and the second radio at the access point; absolute timing of a neighboring cell in the network; or differential timing corresponding to a difference in timing between the first radio and a neighboring cell in the network.

36. The access point of claim 29, wherein the trigger comprises: receiving, utilizing the second radio, a request from the UE to provide to the user equipment over the second wireless link the aiding information for adjusting the first wireless link.

37. The access point of claim 29, wherein the trigger corresponds to a predetermined timing.

38. The access point of claim 29, wherein the first radio is configured to provide a WWAN link.

39. The access point of claim 29, wherein the second radio is configured to provide at least one of: a low-power radio link, or an out-of-band radio link.

40. A user equipment (UE) configured for wireless communication, comprising:
a first radio for communication via a wireless wide area network (WWAN);
a second radio;
means for performing an initial calibration corresponding to the first radio; means for entering a low-power state; and
means for receiving, utilizing the second radio, aiding information for communication via the WWAN to perform another initial calibration at a later time, the aiding information corresponding at least in part to an adjustment of timing, frequency error, and drift rate information for the first radio while the UE is in a low-power state, with the low-power state being a non-zero power state, wherein the UE receives an adjustment of the timing and/or frequency information corresponding to the first radio from the one or more neighboring cells as a proxy for the UE, wherein the adjustment of the timing and/or frequency information corresponds to a change relative to the timing and/or frequency information corresponding to the initial calibration, in response to a trigger comprising at least one of expiration of a timer, a change in system information, and a request from the UE, wherein the aiding information is received as at least one of:
a periodic communication of aiding information,
aiding information communication sent separately from a wake up indicator, and
a response to a request from the UE for the aiding information;
means for adjusting the timing and/or frequency information for the second radio at the UE in response to receiving the aiding information from the access point; and
means for sending information corresponding to the adjustment of timing and/or frequency information from the second radio at the UE to the first radio at the UE to calibrate the timing and/or frequency information between the first radio and the second radio at the UE.

41. The UE of claim 40, further comprising:
means for adjusting a first wireless link between the first radio and a corresponding first radio at the access point; and
means for communicating with the access point over the first wireless link adjusted in accordance with the aiding information.

42. The UE of claim 40, wherein the adjustment of the timing and/or frequency information corresponds to a change relative to the timing and/or frequency information corresponding to the initial calibration.

43. A non-transitory computer-readable medium storing computer executable code, operable at an access point comprising a first radio for communication via a wireless wide area network (WWAN) and a second radio, comprising instructions for causing a computer to:
perform an initial calibration corresponding to the first radio by exchanging information with a user equipment (UE) using the first radio;
act as a proxy for the UE by gathering system information corresponding to the first radio from one or more neighboring cells including utilizing a WWAN network interface to obtain the timing and/or frequency information from the one or more neighboring cells in the WWAN network corresponding to the first radio for the UE while the UE is in a low-power state, wherein, in response to a trigger, the access point determines an adjustment of the timing and/or frequency information corresponding to the first radio from the one or more neighboring cells as the proxy for the UE, wherein the trigger comprises at least one of expiration of a timer, a change in system information, and a request from the UE, wherein the WWAN network interface of the access point comprises one of:
network listen circuitry for sniffing an WWAN air interface corresponding to at least one neighboring cell in the WWAN network in order to obtain the frequency and/or timing information for the WWAN network as the proxy for the UE while the UE is in the low-power state; or
a backhaul connection configured for utilizing an Internet connection to communicate with the WWAN network in order to obtain the frequency and/or timing information for the WWAN network as the proxy for the UE while the UE is in the low-power state; and
transmit, utilizing the second radio, aiding information corresponding at least in part to the adjustment of timing, frequency error, and drift rate information for the first radio to the UE for communication via the WWAN, wherein the aiding information is part of a wake-up indicator to wake up the UE from the low-power state, with the low-power state being a non-zero power state.

44. The non-transitory computer-readable medium of claim 43, wherein the aiding information is configured to be used by the UE to adjust a first wireless link between the first radio at the access point and a corresponding first radio at the UE; and
wherein the non-transitory computer-readable medium further comprises instructions for causing a computer to communicate with the UE over the first wireless link adjusted in accordance with the aiding information.

45. The non-transitory computer-readable medium of claim 43, wherein instructions for causing a computer to perform the initial calibration are further configured for exchanging information with the UE utilizing the first radio to calibrate timing and/or frequency information between the first radio at the access point and a corresponding first radio at the UE.

46. The non-transitory computer-readable medium of claim 45, wherein the instructions for causing a computer to determine an adjustment of timing and/or frequency information corresponding to the first radio are further configured for determining a change relative to the timing and/or frequency information corresponding to the initial calibration; and
wherein the instructions for causing a computer to transmit aiding information are further configured for transmitting information corresponding to the change.

47. The non-transitory computer-readable medium of claim 43, wherein the instructions for causing a computer to perform the initial calibration are further configured for exchanging information between the first radio and the second radio at the access point, to calibrate timing and/or frequency information between the first radio and the second radio at the access point.

48. The non-transitory computer-readable medium of claim 47, wherein the instructions for causing a computer to determine an adjustment of timing and/or frequency information corresponding to the first radio are further configured for determining a change relative to the timing and/or frequency information corresponding to the initial calibration,
the non-transitory computer-readable medium further comprising instructions for causing a computer to send information corresponding to the change from the first radio to the second radio of the access point,
wherein the instructions for causing a computer to transmit aiding information are further configured for transmitting the information corresponding to the change.

49. The non-transitory computer-readable medium of claim 43, wherein the aiding information further comprises at least one of: channel measurements corresponding to an air interface with at least one cell; frequency information corresponding to the air interface with the at least one cell; a strength of a reference signal from the at least one cell; ranking information of reference signals from a plurality of cells in a network corresponding to the first radio; absolute timing corresponding to the first radio; differential timing corresponding to a difference in timing between the first radio and the second radio at the access point; absolute timing of a neighboring cell in the network; or differential timing corresponding to a difference in timing between the first radio and a neighboring cell in the network.

50. The non-transitory computer-readable medium of claim 43, wherein the trigger comprises: receiving, utilizing the second radio, a request from the UE to provide to the user equipment over the second wireless link the aiding information for adjusting the first wireless link.

51. The non-transitory computer-readable medium of claim 43, wherein the trigger corresponds to a predetermined timing.

52. The non-transitory computer-readable medium of claim 43, wherein the first radio is configured to provide a WWAN link.

53. The non-transitory computer-readable medium of claim 43, wherein the second radio is configured to provide at least one of: a low-power radio link, or an out-of-band radio link.

54. A non-transitory computer-readable medium storing computer executable code, operable at a user equipment (UE) comprising a first radio for communication via a wireless wide area network (WWAN) and a second radio, comprising instructions for causing a computer to:
  performing an initial calibration corresponding to the first radio by exchanging information with an access point utilizing the first radio to calibrate timing and/or frequency information between the first radio at the UE and a corresponding first radio at the access point;
  entering a low-power state;
  receiving, utilizing the second radio, aiding information for communication via the WWAN to perform another initial calibration at a later time, the aiding information corresponding at least in part to an adjustment of timing, frequency error, and drift rate information for the first radio while the UE is in a low-power state, with the low-power state being a non-zero power state, wherein the UE receives an adjustment of the timing and/or frequency information corresponding to the first radio from the one or more neighboring cells as a proxy for the UE, wherein the adjustment of the timing and/or frequency information corresponds to a change relative to the timing and/or frequency information corresponding to the initial calibration, in response to a trigger comprising at least one of expiration of a timer, a change in system information, and a request from the UE, wherein the aiding information is received as at least one of:
    a periodic communication of aiding information,
    aiding information communication sent separately from a wake up indicator, and
    a response to a request from the UE for the aiding information;
  adjusting the timing and/or frequency information for the second radio at the UE in response to receiving the aiding information from the access point; and
  sending information corresponding to the adjustment of timing and/or frequency information from the second radio at the UE to the first radio at the UE to calibrate the timing and/or frequency information between the first radio and the second radio at the UE.

55. The non-transitory computer-readable medium of claim 54, further comprising instructions for causing a computer to:
  adjust a first wireless link between the first radio and a corresponding first radio at the access point; and
  communicate with the access point over the first wireless link adjusted in accordance with the aiding information.

56. The non-transitory computer-readable medium of claim 54, wherein the adjustment of the timing and/or frequency information corresponds to a change relative to the timing and/or frequency information corresponding to the initial calibration.

* * * * *